(12) United States Patent
Jariwala et al.

(10) Patent No.: US 12,442,103 B2
(45) Date of Patent: Oct. 14, 2025

(54) NANO AND QUANTUM SIZED PARTICLES FROM ATOMICALLY THIN TRANSITION METAL DICHALCOGENIDES AND RELATED METHODS

(71) Applicant: The Trustees of the University of Pennsylvania, Philadelphia, PA (US)

(72) Inventors: Deep Jariwala, Philadelphia, PA (US); Eric Andrew Stach, Swarthmore, PA (US); Pawan Kumar, Philadelphia, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 0 days.

(21) Appl. No.: 17/674,964

(22) Filed: Feb. 18, 2022

(65) Prior Publication Data

US 2022/0325432 A1    Oct. 13, 2022

Related U.S. Application Data

(60) Provisional application No. 63/151,353, filed on Feb. 19, 2021.

(51) Int. Cl.
*C30B 29/32*  (2006.01)
*C01G 39/00*  (2006.01)
*C30B 1/02*   (2006.01)

(52) U.S. Cl.
CPC .............. *C30B 1/023* (2013.01); *C01G 39/00* (2013.01)

(58) Field of Classification Search
CPC .......... C30B 1/023; C30B 29/32; C30B 29/46
See application file for complete search history.

(56) References Cited

U.S. PATENT DOCUMENTS

| 10,414,668 B1* | 9/2019 | Vaia ........................... C01G 1/12 |
| 11,063,164 B1* | 7/2021 | Engel .................... H01L 31/078 |
| 2016/0153098 A1* | 6/2016 | Hackenberg .............. C25B 1/04 |
| | | 205/639 |

FOREIGN PATENT DOCUMENTS

WO   WO-2015091781 A2 *  6/2015  ............ C23C 16/02

OTHER PUBLICATIONS

W M R Divigalpitiya et al , Effect of humidity on spread NbS, films J. Phys. D: Appl. Phys. 23 (1990) 966-970.*
Ye et al. "Synthesis of large-scale atomic-layer SnS2 through chemical vapor deposition " Nano Research 2017, 10(7): 2386-2394.*
Szary "Bonding and electronics of the MoTe2/Ge interface under strain" Physical Review B 95, 205421 (2017).*
Bampoulis et al Local Conduction in MoxW1—xSe2: The Role of Stacking Faults, Defects, and Alloying ACS Applied Materials & Interfaces 2018, 10, 13218-13225.*

(Continued)

*Primary Examiner* — Robert M Kunemund
(74) *Attorney, Agent, or Firm* — BakerHostetler

(57) ABSTRACT

Provided are novel transition metal dichalcogenides having a platelet structure and comprising a 2H phase region and/or a 3R phase region. The platelets exhibit a narrow size distribution and comparatively high surface area and edge area, which characteristics render the platelets especially suitable for catalysis applications, as well as use in electronic devices. Also provided are methods of synthesizing the disclosed transition metal dichalcogenide platelets.

11 Claims, 28 Drawing Sheets

(56) References Cited

OTHER PUBLICATIONS

Cevallos et al Liquid Salt Transport Growth of Single Crystals of the Layered Dichalcogenides MoS2 and WS2 Cryst. Growth Des. 2019, 19, 5762-5767.*
Gong et al Two-Step Growth of Two-Dimensional WSe2/MoSe2 Heterostructures Nano Lett. 2015, 15, 6135-6141N.*
Price, C. C., et al. Engineering Zero-Dimensional Quantum Confinement in Transition-Metal Dichalcogenide Heterostructures. ACSNano 13, 8303-8311, doi:10.1021/acsnano.9b03716 (2019).
Ryu, G. H. et al. Atomic Structure and Dynamics of Self-Limiting Sub-Nanometer Pores in Monolayer WS2. ACSNano 12, 11638-11647, doi:10.1021/acsnano.8b07051 (2018).
Sangwan, V. K. et al. Gate-tunable memristive phenomena mediated by grain boundaries in single-layer MoS2. Nature Nanotechnology 10, 403-406, doi: 10.1038/nnano.2015.56 (2015).
Scientific, H. MEMSHeating + Biasing, http://hummingbirdscientific.com/products/heating-biasing.
Sood, A. et al. Quasi-Ballistic Thermal Transport Across MoS2 Thin Films. Nano Letters 19, 2434-2442, doi: 10.1021/acs.nanolett.8b05174 (2019).
Sutter, E. et al. Electron-Beam Induced Transformations of Layered Tin Dichalcogenides. Nano Letters 16, 4410-4416, doi:10.1021/acs.nanolett.6b01541 (2016).
Tai, K. L. et al. Atomic-Scale Fabrication of In-Plane Heterojunctions of Few-Layer MoS2 via In Situ Scanning Transmission Electron Microscopy. Small, doi: 10.1002/smll.201905516 (2019).
Tesfaye, F. et al. Phase Equilibria and Thermochemistry ofSelected Sulfide Systems in the Pyrometallurgy of Ni and Cu (2012).
Van der Walt, S. et al. scikit-image: image processing in Python. PeerJ 2, e453-e453, doi:10.7717/peerj.453 (2014).
Voiry, D. et al. Phase engineering oftransition metal dichalcogenides. Chemical Society Reviews 44, 2702-2712, doi:10.1039/C5CS00151J (2015).
Wang, S. et al. Shape Evolution of Monolayer MoS2 Crystals Grown by Chemical Vapor Deposition. Chemistry of Materials 26, 6371-6379, doi: 10.1021/cm5025662 (2014).
Xu, W. et al. In-situ atomic-scale observation of irradiation-induced void formation. Nature Communications 4, 2288, doi:10.1038/ncomms3288 (2013).
Ye, H. et al. Toward a Mechanistic Understanding ofVertical Growth of van der Waals Stacked 2D Materials: A Multiscale Model and Experiments. ACSNano 11, 12780-12788, doi:10.1021/acsnano.7b07604 (2017).
Zhao, W. et al. Energetics and kinetics of phase transition between a 2H and a 1T MoS2 monolayer—a theoretical study. Nanoscale 9, 2301-2309, doi:10.1039/C6NR08628D (2017).
Zhao, X. et al. Healing of Planar Defects in 2D Materials via Grain Boundary Sliding. AdvancedMaterials 31, 1900237, doi:10.1002/adma.201900237 (2019).
Zhou, W. et al. Intrinsic Structural Defects in Monolayer Molybdenum Disulfide. Nano Letters 13, 2615-2622, doi: 10.1021/nl4007479 (2013).
Zuluaga, S. et al. Two-dimensional PdSe2—Pd2Se3 junctions can serve as nanowires. 2D Materials 5, 035025, doi: 10.1088/2053-1583/aac34c (2018).
Carvalho et al., "Intervalley scattering by acoustic phonons in two-dimensional MoS2 revealed by double-resonance Raman spectroscopy", Nature Communications, 2017, 8, 14670, doi:10.1038/ncomms14670.
Chen et al., "Atomic Structure and Dynamics of Defects and Grain Boundaries in 2D Pd2Se3 Monolayers", ACS Nano, 2019, 13, 8256-8264, doi:10.1021/acsnano.9b03645.
Chen et al., "Atomically Flat Zigzag Edges in Monolayer MoS2 by Thermal Annealing", Nano Letters, 2017, 17, 5502-5507, doi:10.1021/acs.nanolett.7b02192.
Chen et al., "In situ high temperature atomic level dynamics of large inversion domain formations in monolayer MoS2", Nanoscale, 2019, 11, 1901-1913, doi:10.1039/C8NR08821G.
Chen et al., "Interface confined hydrogen evolution reaction in zero valent metal nanoparticles-intercalated molybdenum disulfide", Nature Communications, 2017, 8,14548, doi: 10.1038/ncomms14548.
Chen et al., "Thermal Degradation of Monolayer MoS2 on SrTiO3 Supports", The Journal of Physical Chemistry C, 2019, 123, 3876-3885, doi: 10.1021/acs.jpcc. 8b 11298.
Chen et al., "Ultralong ID Vacancy Channels for Rapid Atomic Migration during 2D Void Formation in Monolayer MoS2", ACS Nano, 2018, 12, 7721-7730, doi: 10.1021/acsnano. 8b01610.
Chhowalla et al., "The chemistry of two-dimensional layered transition metal dichalcogenide nanosheets", Nature Chemistry, 2013, 5, 263-275, doi: 10.1038/nchem, 1589.
Chhowalla et al., "Two-dimensional transition metal dichalcogenide (TMD) nanosheets", Chemical Society Reviews, 2015, 44, 2584-2586, doi:10.1039/C5CS90037A.
Couchman et al., "Thermodynamic theory of size dependence of melting temperature in metals", Nature, 1977, 269, 481-483, doi:10.1038/269481a0.
Duan et al., "Lateral epitaxial growth of two-dimensional layered semiconductor heterojunctions", Nature Nanotechnology, 2014, 9, 1024-1030, doi:10.1038/nnano.2014.222.
Dumcenco et al., "Large-Area Epitaxial Monolayer MoS2", ACS Nano, 2015, 9, 4611-4620, doi: 10.1021/acsnano.5b01281.
Eda et al., "Coherent Atomic and Electronic Heterostructures of Single-Layer MoS2", ACS Nano, 2012, 6, 7311-7317, doi: 10.1021/nn302422x.
Elibol et al., "Atomic Structure of Intrinsic and Electron-Irradiation Induced Defects in MoTe2", Chemistry of Materials, 2018, 30, 1230-1238, doi: 10.1021/acs.chemmater.7b03760.
Faculty of Mathematics and Natural Sciences. QSTEM: Quantitative TEM/STEMSimulations, https://www.physics.hu-berlin.de/en/sem/software/software_qstem> (2002).
Frankel et al, "Effects of vacuum on materials", Esro Environ. and Their Roleinspacecraft Technol., Jan. 1, 1969, 1, 137-181.
Fu et al., "Molecular Beam Epitaxy of Highly Crystalline Monolayer Molybdenum Disulfide on Hexagonal Boron Nitride", Journal of the American Chemical Society, 2017, 139, 9392-9400, doi:10.1021/jacs.7b05131.
Gong et al., "Vertical and in-plane heterostructures from WS2/MoS2 monolayers", Nature Materials, 2014, 13, 1135-1142, doi:10.1038/nmat4091.
Hu et al., "Two-dimensional transition metal dichalcogenides: interface and defect engineering", Chemical Society Reviews, 2018, 1, 3100-3128, doi: 10.1039/C8CS00024G.
Jariwala et al., "Emerging Device Applications for Semiconducting Two-Dimensional Transition Metal Dichalcogenides", ACS Nano, 2014, 8, 1102-1120, doi:10.1021/nn500064s.
Jariwala et al., "Mixed-dimensional van der Waals heterostructures", Nature Materials, 2017, 16, 170-181, doi:10.1038/nmat4703.
Johnson et al., "A molybdenum sulfur binary phase diagram", Scripta Metallurgica, 1983, 17, 919-922, doi:https://doi.org/10.1016/0036-9748(83)90262-4.
Kappera et al., "Phase-engineered low-resistance contacts for ultrathin MoS2 transistors", Nature Materials,2014, 13, 1128-1134, doi:10.1038/nmat4080.
Koma et al., "Fabrication and characterization of heterostructures with subnanometer thickness", Microelectronic Engineering, 1984, 2, 129-136, doi: 10.1016/0167-9317(84)90057-1.
Komsa et al., "Native defects in bulk and monolayer MoS2 from first principles", Physical Review B 91, 2015, 125304, doi: 10.1103/PhysRevB.91.125304.
Kumar et al., "Direct Visualization of out-of-equilibrium structural transformations in atomically thin chalcogenides", NPJ 2D Mater Appl., 4, 15, 2020.
Kumar et al., "Effect of Sulfur Evaporation Rate on Screw Dislocation Driven Growth ofMoS2 with High Atomic Step Density", Crystal Growth & Design, 2016, 16, 7145-7154, doi:10.1021/acs.cgd.6b01367.
Kumar et al., "Horizontally and vertically aligned growth of strained MoS2 layers with dissimilar wetting and catalytic behaviors", Cryst Eng Comm, 2017, 19, 5068-5078, doi:10.1039/C7CE01162H.
Kumar et al., "Phase engineering of seamless heterophase homojunctions with co-existing 3R and 2H phases in WS2 monolayers", Nanoscale, 2018, 10, 3320-3330, doi: 10.1039/C7NR08303C.

(56) References Cited

OTHER PUBLICATIONS

Kumar et al., "Scalable faceted voids with luminescent enhanced edges in WS2 monolayers", Nanoscale, 2018, 10, 16321-16331, doi:10.1039/C8NR02246A.

Lai et al., "Size-Dependent Melting Properties of Small Tin Particles: Nanocalorimetric Measurements", Physical Review Letters, 1996, 77, 99-102, doi: 10.1103/PhysRevLett.77.99.

Le, D. et al. Single-Layer MoS2 with Sulfur Vacancies: Structure and Catalytic Application. The Journal of Physical Chemistry C 118, 5346-5351, doi: 10.1021/jp411256g (2014).

Lehnert, T. et al. Electron-Beam-Driven Structure Evolution of SingleLayer MoTe2 for Quantum Devices. ACS Applied Nano Materials 2, 3262-3270, doi: 10.1021/acsanm.9b00616 (2019).

Leng, K. et al. Phase Restructuring in Transition Metal Dichalcogenides for Highly Stable Energy Storage. ACSNano 10, 9208-9215, doi: 10.1021/acsnano.6b05746 (2016).

Li, H. et al. Epitaxial Growth of Two-Dimensional Layered TransitionMetal Dichalcogenides: Growth Mechanism, Controllability, and Scalability. Chemical Reviews 118, 6134-6150, doi:10.1021/acs.chemrev.7b00212 (2018).

Li, H. et al. Preparation and Applications of Mechanically Exfoliated Single-Layer and Multilayer MoS2 and WSe2 Nanosheets. Accounts of Chemical Research 47, 1067-1075, doi:10.1021/ar4002312 (2014).

Li, L. et al. Role of Sulfur Vacancies and Undercoordinated Mo Regions in MoS2 Nanosheets toward the Evolution of Hydrogen. ACS Nano 13, 6824-6834, doi:10.1021/acsnano.9b01583 (2019).

Li, S. et al. Vapour-liquid-solid growth of monolayer MoS2 nanoribbons. Nature Materials 17, 535-542, doi:10.1038/s41563-018-0055-z (2018).

Li, Z. et al. Direct Observation of Gate-Tunable Dark Trions in Monolayer WSe2. Nano Letters 19, 6886-6893, doi:10.1021/acs.nanolett.9b02132 (2019).

Lin Y. C. etal. Does the metallic IT phase WS2 really exist? arXiv: 1907.11398 (2019).

Lin, J. et al. Novel Pd2Se3 Two-Dimensional Phase Driven by Interlayer Fusion in Layered PdSe2. Physical Review Letters 119, 016101, doi: 10.1103/PhysRevLett. 119.016101 (2017).

Lin, Y.-C., et al. Atomic mechanism of the semiconducting-to-metallic phase transition in single-layered MoS2. Nature Nanotechnology 9, 391-396, doi:10.1038/nnano.2014.64 (2014).

Malhotra, A. et al. Impact of Phonon Surface Scattering on Thermal Energy Distribution of Si and SiGe Nanowires. Scientific Reports 6, 25818, doi:10.1038/srep25818 (2016).

McKie, J., "Gatan Launches the OneView Camera at M&M 2014, Hartford, CT," retrieved from https://www.gatan.com/company/news/gatan-launches-oneview-camera-mm-2014-hartford-ct, Aug. 4, 2014, pp. 3.

Mendes, R. G. et al. Electron-Driven In Situ Transmission Electron Microscopy of 2D Transition Metal Dichalcogenides and Their 2D Heterostructures. ACS Nano 13, 978-995, doi:10.1021/acsnano.8b08079 (2019).

Murthy, A. A. et al. Direct Visualization of Electric-Field-Induced Structural Dynamics in Monolayer Transition Metal Dichalcogenides. ACSNano, doi: 10.1021/acsnano. 9bO6581 (2020).

Ng, H. K. et al. Effects of Structural Phase Transition on Thermoelectric Performance in Lithium-Intercalated Molybdenum Disulfide (LixMoS2). ACS Applied Materials & Interfaces 11, 12184-12189, doi:10.1021/acsami.8b22105 (2019).

Novoselov, K. S. et al. Two-dimensional atomic crystals. Proceedings of the National Academy of Sciences of the United States of America 102, 10451-10453, doi:10.1073/pnas.0502848102 (2005).

Oliva, R. et al. Pressure dependence of direct optical transitions in ReS2 and ReSe2. npj 2D Materials and Applications 3, 20, doi:10.1038/s41699-019-0102-x (2019.

Pitthan, E., et al. Annealing Response of Monolayer MoS2 Grown by Chemical Vapor Deposition. ECS Journal of Solid State Science and Technology 8, P267-P270, doi: 10.1149/2.0061904jss (2019).

\* cited by examiner

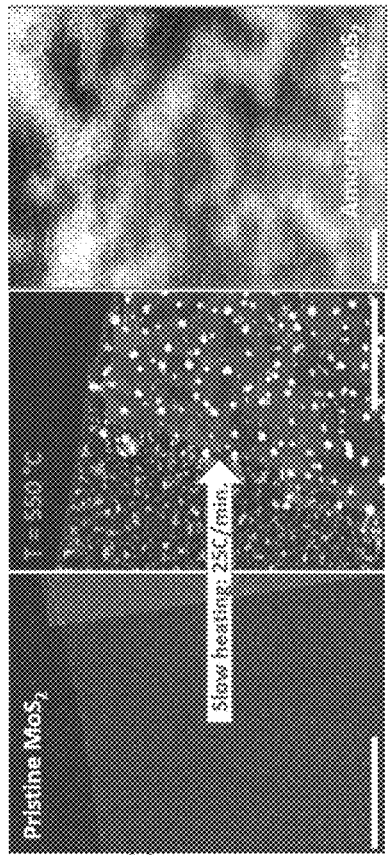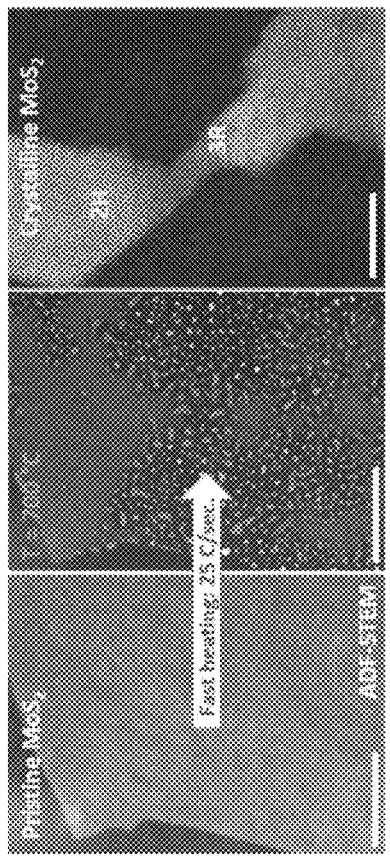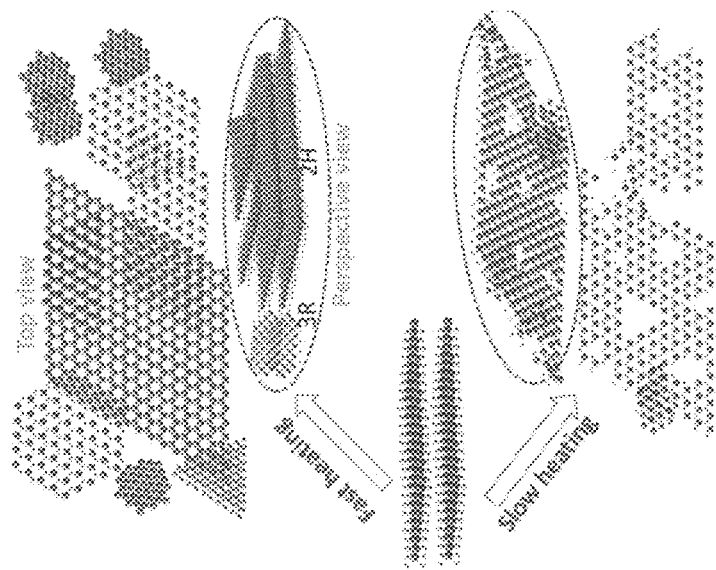

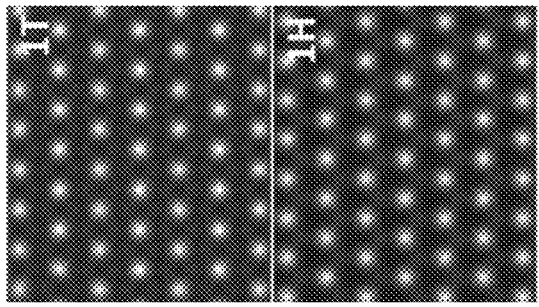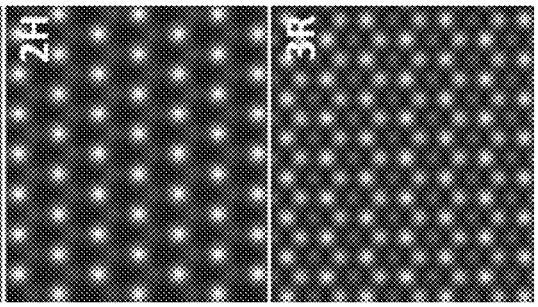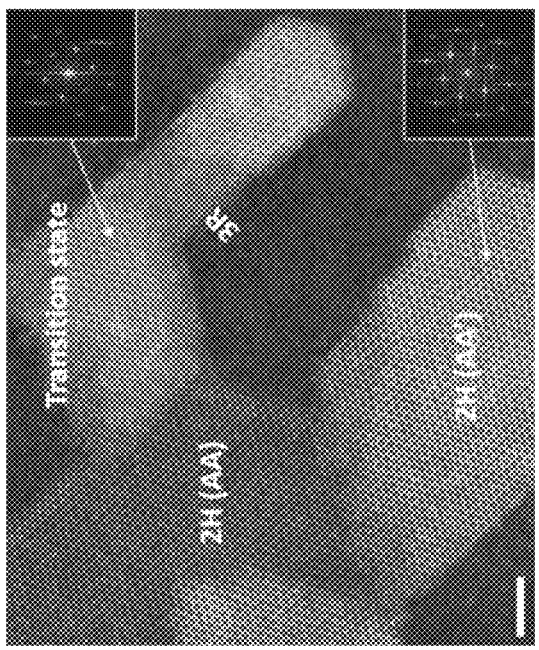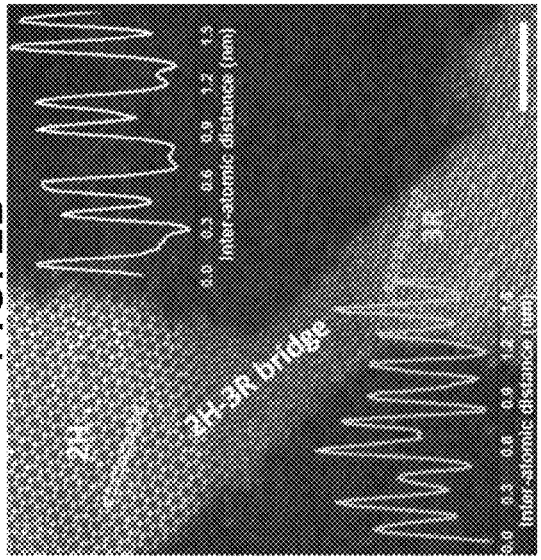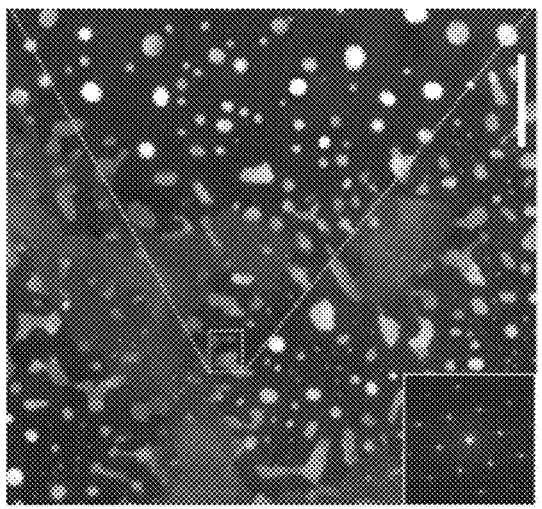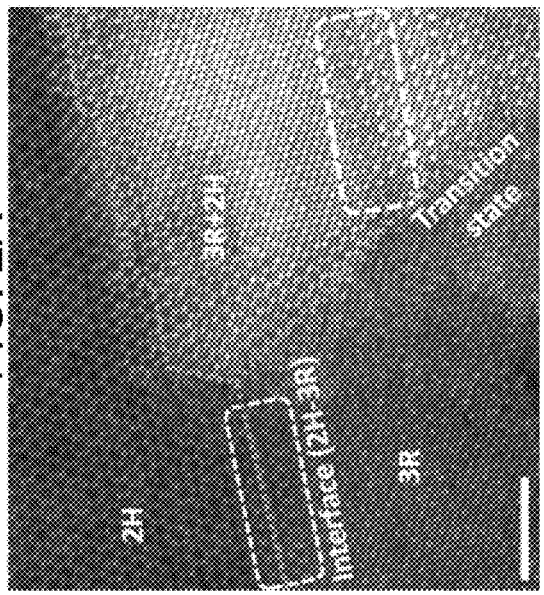
FIG. 2A  FIG. 2B  FIG. 2C  FIG. 2D  FIG. 2E

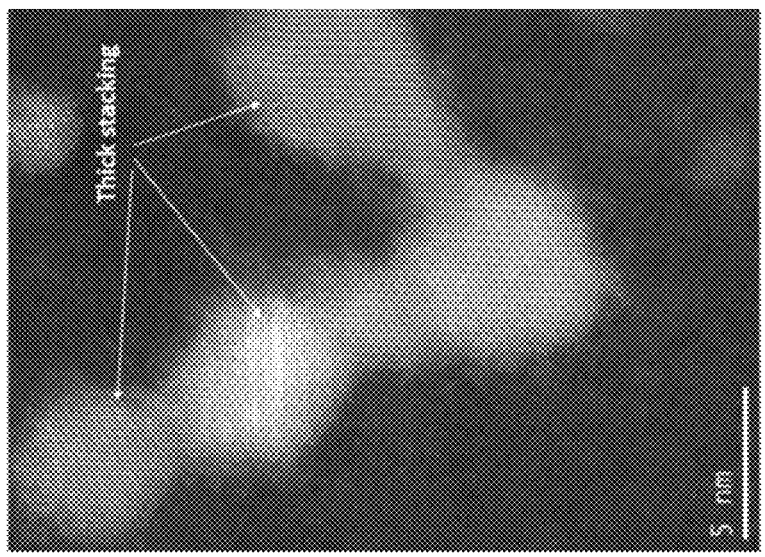
FIG. 12C
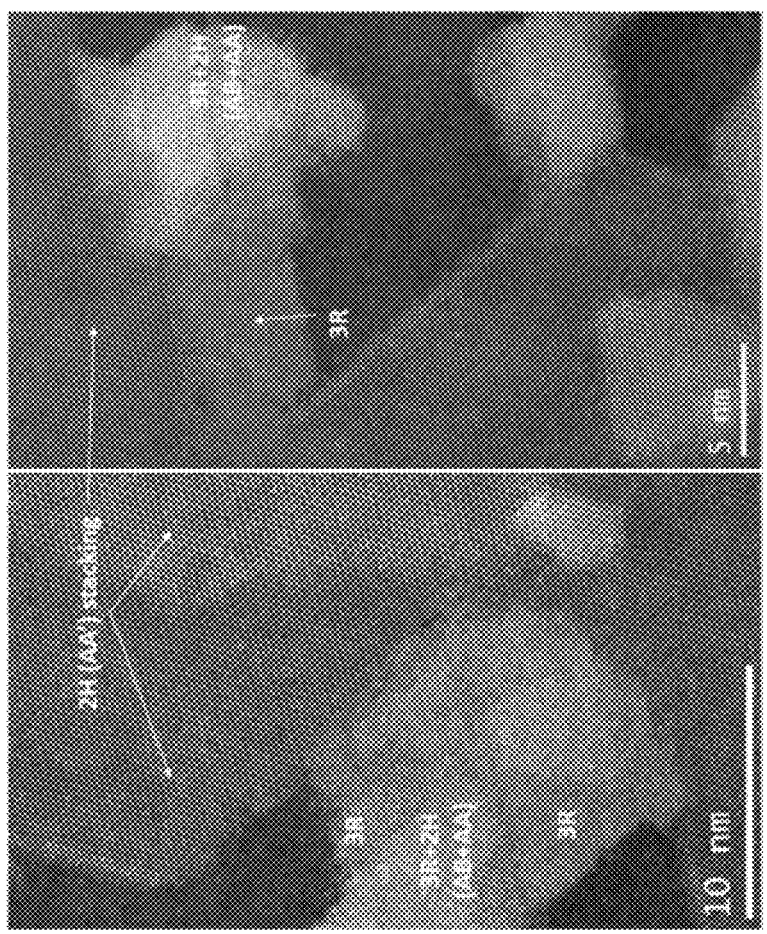
FIG. 12B
FIG. 12A

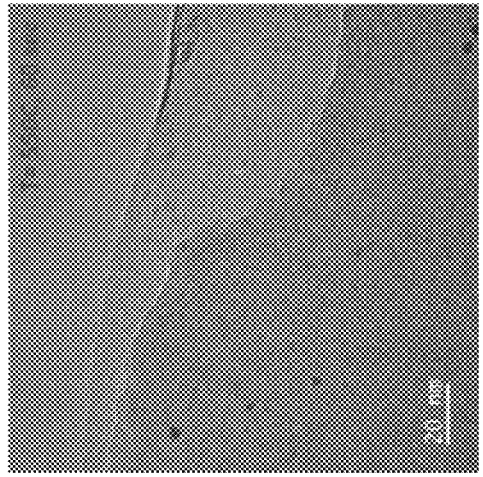
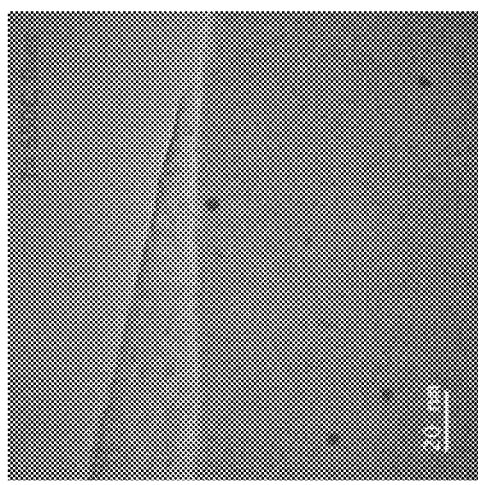
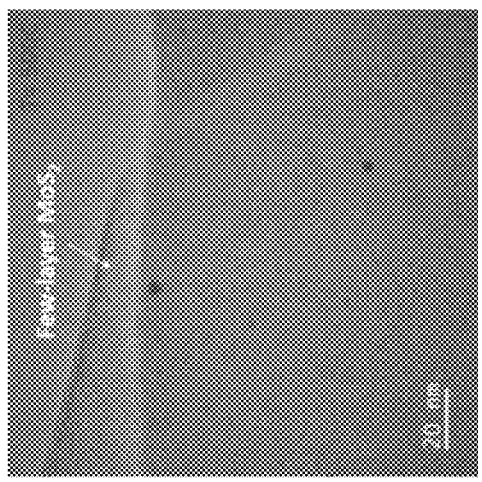
FIG. 14C
FIG. 14B
FIG. 14A

At T= 650°C with increasing time (1-6)

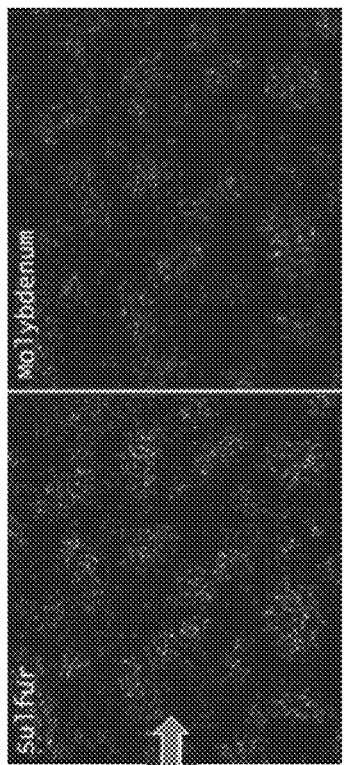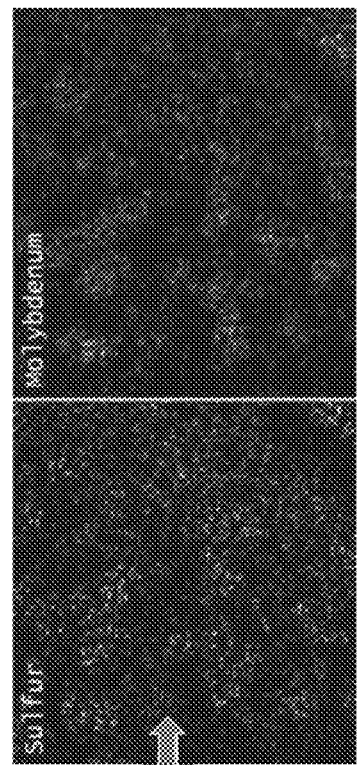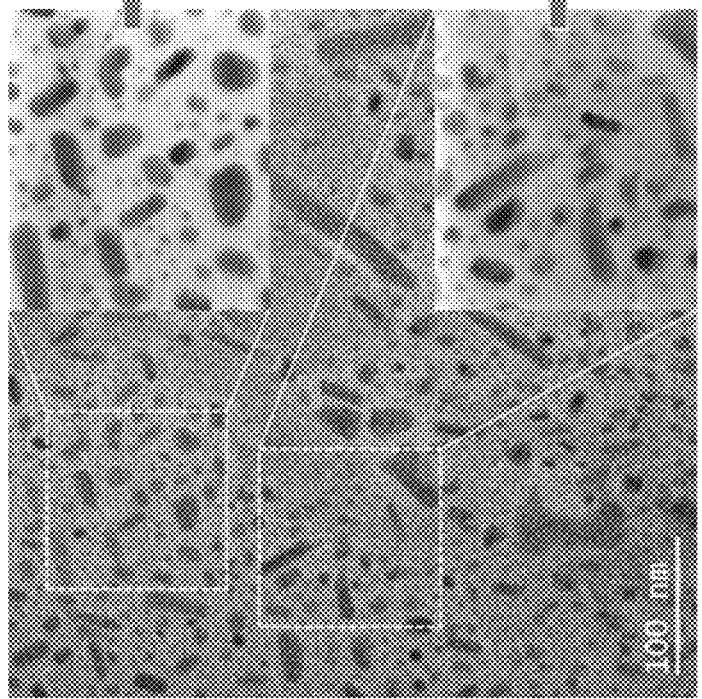
FIG. 16B
FIG. 16C
FIG. 16A

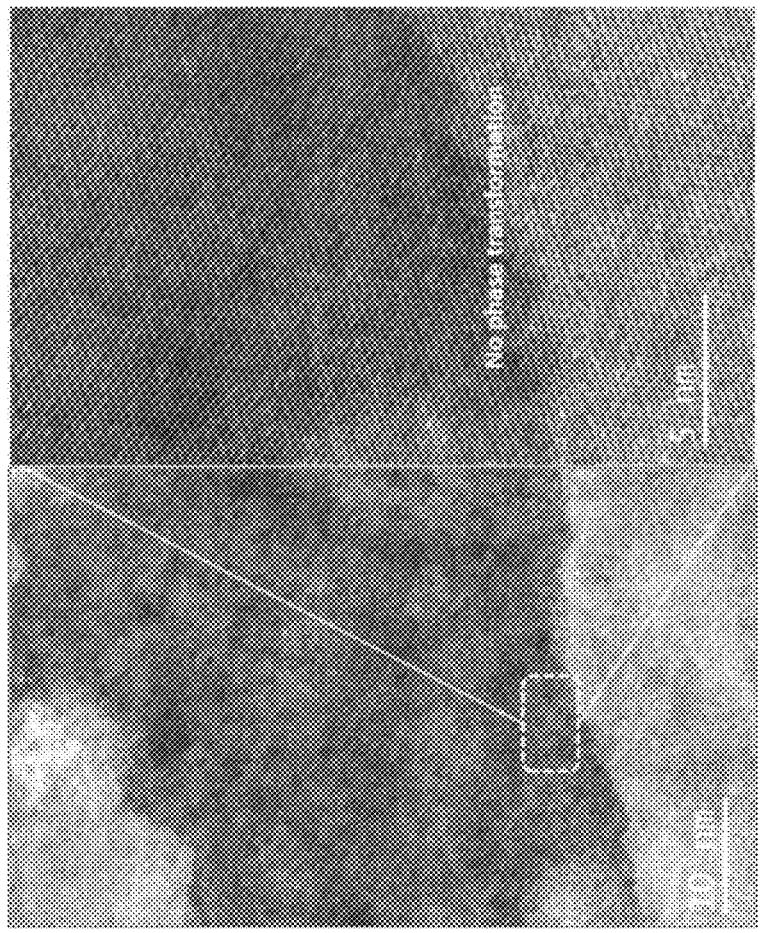
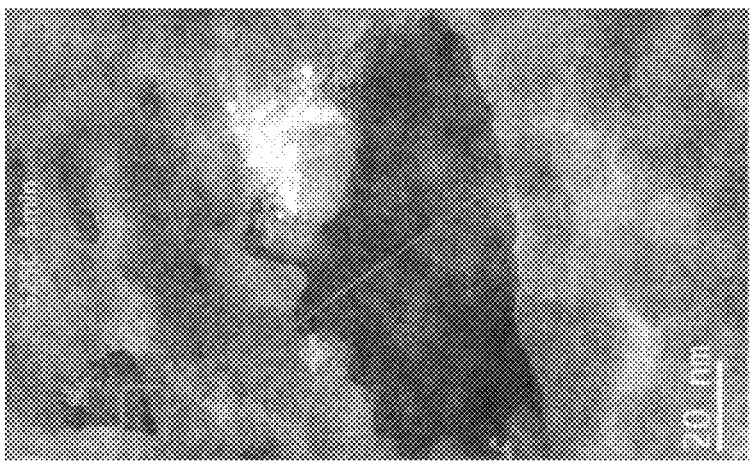
FIG. 17A  FIG. 17B  FIG. 17C

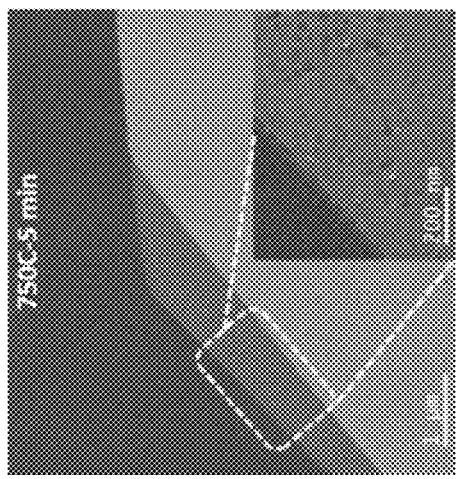
FIG. 21A
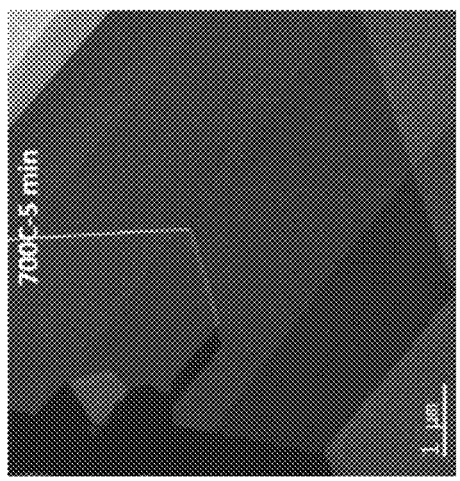
FIG. 21B
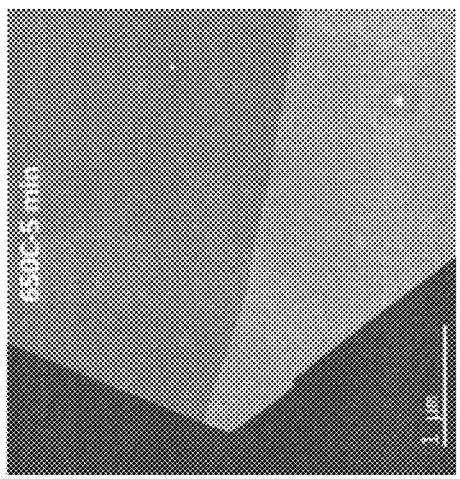
FIG. 21C
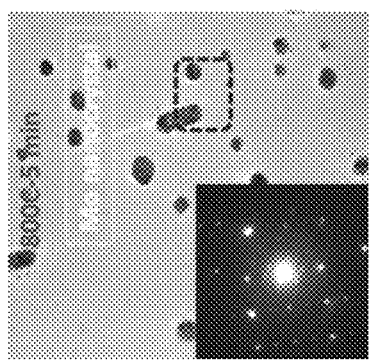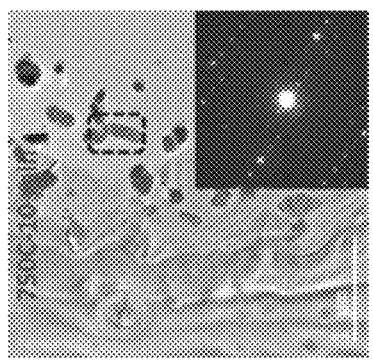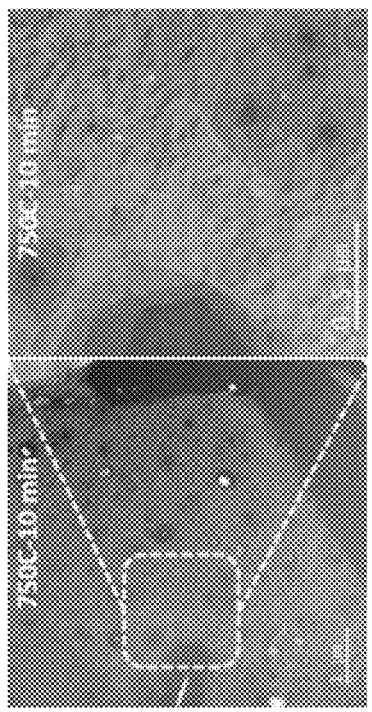
FIG. 21D
FIG. 21E
FIG. 21F
FIG. 21G

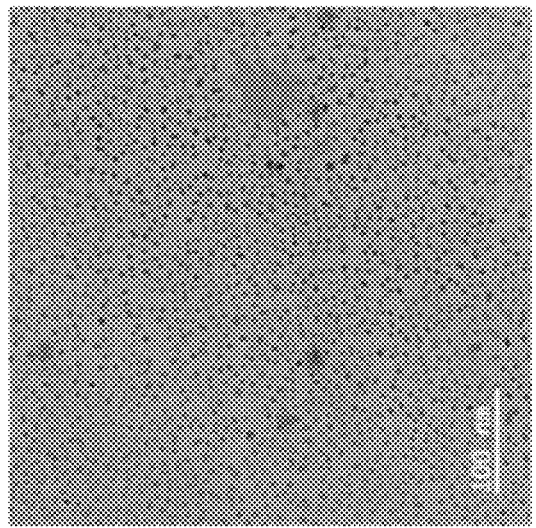
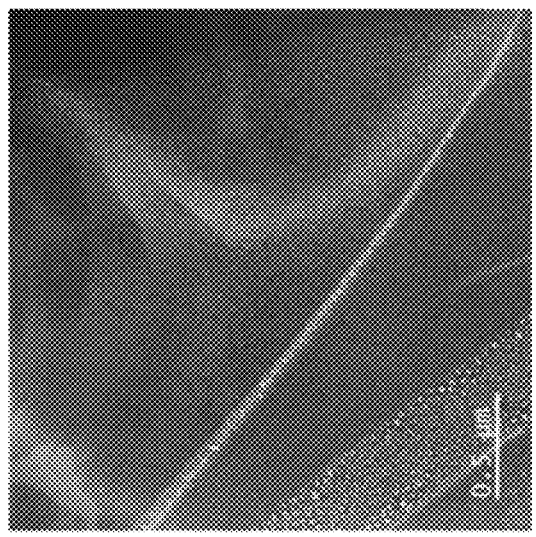
◆ MoSe$_2$ quantum particle formation at 650C.
FIG. 26

❖ WSe₂ quantum particle formation at 950C.

NANO AND QUANTUM SIZED PARTICLES FROM ATOMICALLY THIN TRANSITION METAL DICHALCOGENIDES AND RELATED METHODS

RELATED APPLICATIONS

The present application claims priority to and the benefit of U.S. patent application No. 63/151,353, "Nano And Quantum Sized Particles From Atomically Thin Transition Metal Dichalcogenides And Related Methods" (filed Feb. 19, 2021), the entirety of which application is incorporated herein by reference for any and all purposes.

GOVERNMENT RIGHTS

This invention was made with government support under 1542153, 1720530, 1905853, and 1809398 awarded by the National Science Foundation and W911NF-19-1-0109 awarded by the Army. The government has certain rights in the invention.

TECHNICAL FIELD

The present disclosure relates to the field of transition metal dichalcogenides and to the field of platelet materials.

BACKGROUND

Two-dimensional nanomaterials have received significant attention due to the wide range of exciting properties that they exhibit. Transition metal dichalcogenides (TMDCs) have garnered particular interest due to their ability to be utilized in novel electronic device applications. Accordingly, there is a long-felt need in the art for improved compositions of TMDC materials as well as methods for synthesizing such improved compositions.

SUMMARY

In meeting the described long-felt needs, the present disclosure first provides compositions, comprising: a population of crystalline transition metal dichalcogenide platelets having the empirical formula $MC_2$, wherein M is a transition metal and C is a chalcogenide, each of the platelets comprising a region of 2H phase and/or a region of 3R phase, and each of the platelets being characterized as comprising a single atomic layer to a few atomic layers.

Also provided is a hydrodesulfurization or hydrodenitrogenation catalyst, the hydrodesulfurization or hydrodenitrogenation catalyst comprising an amount of a composition according to the present disclosure.

Further provided is an emitter, the emitter comprising an amount of a composition according to the present disclosure.

Additionally disclosed is a photodetector, the photodetector comprising an amount of a composition according to the present disclosure.

Further provided is a method, comprising contracting petroleum, a petroleum derivative, or a fuel with a composition according to the present disclosure so as to effect removal or chemical conversion of a component of the petroleum, the petroleum derivative, or the fuel.

Also disclosed is a method, comprising collecting a signal related to the illumination of a device that comprises a composition according to the present disclosure.

Further provided is a method, comprising effecting emission of illumination from a device that comprises a composition according to the present disclosure.

Also disclosed is a method, comprising contacting water or an aqueous medium with a composition according to the present disclosure under such conditions so as to effect formation of oxygen and hydrogen from the water.

Further provided is a method, comprising: heating a transition metal dichalcogenide material having the empirical formula $MC_2$ at a rate of from about 20 to about 50 deg. C./second, wherein M is a transition metal and C is a chalcogenide, and wherein the heating is applied so as to give rise to a composition comprising population of crystalline transition metal dichalcogenide platelets, each of the platelets comprising a region of 2H phase and/or a region of 3R phase, and each of the platelets being characterized as comprising a single layer to a few atomic layers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 1A-1G provide direct visualization of diffusion processes for non-equilibrium vs. equilibrium environments. (FIG. 1A) Schematic of the pathways for disintegration vs. decomposition of 2D layers in two discrete environments. (FIG. 1B, 1E) Scanning transmission electron microscopy (STEM) imaging of pristine bilayer $MoS_2$, as transferred to the specific microfabricated heating chips with supporting $SiN_x$ membrane underneath for FIG. 1B fast-heating (non-equilibrium) and FIG. 1E slow-heating (equilibrium). FIGS. 1C, 1F provide post-heating images of $MoS_2$ flakes for FIG. 1C fast-heating showing nanoscale crystals with uniform intensity contrast and well-defined shapes and FIG. 1F slow-heating showing disordered spherical structures with non-uniform thickness contrast, as imaged using annular dark field (ADF)-STEM, FIG. 1D Fast-heating produces ordered nano-crystallites of $MoS_2$ containing multiple phases while FIG. 1G slow-heating causes decomposition of $MoS_2$ leading to amorphous/disordered structures at the atomic-scale. STEM images in FIG. 1D and FIG. 1G taken correspond to sub-regions in FIG. 1C and FIG. 1F respectively; (Scale bars: FIG. 1B, FIG. 1C: 200 nm, FIG. 1D: 5 nm, FIGS. 1E, 1F: 1 μm, FIG. 1G: 2 nm).

FIGS. 2A, 2B, 2C, 2D, and 2E illustrate ordered $MoS_2$ nanocrystal formation upon fast (25° C./sec) in-situ heating. FIG. 2A Low magnification ADF-STEM image and selected area electron diffraction (SAED) pattern (inset) shows the high degree of crystallinity of disintegrated $MoS_2$ from the large 2D sheets, FIG. 2B High magnification STEM image of the highlighted boxed region in FIG. 2A. The atomic-scale high angle annular dark field (HAADF) STEM image shows the atomic arrangement for different stackings of $MoS_2$. FIG. 2C Simulated STEM images for different polyphases of $MoS_2$ to correlate with the experimentally observed atomic level images. FIG. 2D Atomically-resolved STEM image of a heterojunction region between the 2H and 3R phases, a mixed state (2H+3R) region, and a transition state of restructured 2H $MoS_2$. FIG. 2E Line profiles across the two different phases (2H and 3R) shows the varying atomic positions in the corresponding structures; (Scale bars: FIG. 2A: 50 nm, FIG. 2B, FIG. 2D, FIG. 2E: 2 nm).

FIGS. 12A-12C provide atomic resolution STEM imaging of the highlighted portion of disintegrated bilayer $MoS_2$ having different stacking sequences. (12A-12C) Shows the atomically resolved structural arrangement of two distinct phases. Interestingly, one can see that the rearrangement and formation of different phases only happen when the nanostructure is completely disintegrated. a Bilayer $MoS_2$ remains as original 2H arrangement when it is in a continuous layer after in-situ heating.

FIG. 13A provides ADF-STEM imaging for the in-situ disintegrated bilayer $MoS_2$ and FIGS. 13B-13E provide an atomic-resolution HAADF-STEM images of individual quantum dot like $MoS_2$ particles.

FIGS. 14A-14C provide a time sequence TEM images acquired during the in-situ heating of $MoS_2$ from 500° C. to 550° C. at a slow heating rate (25° C./min) during a 60 second period.

FIGS. 16A-16C provide additional EDS elemental maps for a different sample heated in-situ, confirming the disintegrated nanostructured $MoS_2$.

FIGS. 17A-17C provide atomic resolution STEM images (marked zoom-in regions from FIG. 17A-17C) of bilayer $MoS_2$, heated ex-situ at 525° C. for 5 minutes.

FIG. 19A is one of the brighter spot regions after disintegration at a lower magnification and FIG. 19B is an atomic-scale resolution. An attached inset shows the corresponding FFT pattern.

FIGS. 21A-21G provide HAADF-STEM images from few-layer $MoS_2$ heated at the slow ramping rate (Rate=25° C./min) in an argon (Ar) environment under equilibrium conditions. A slower etching rate and further decomposition occur at higher temperatures in the Ar environment when compared with the rough vacuum (~$10^{-3}$ mbar). ADF-STEM images of ex-situ heated $MoS_2$ layers at FIG. 21Aa 650° C., FIG. 21B 700° C. and FIG. 21C 750° C. for 5 minutes. FIG. 21C inset shows a magnified region belonging small etching in the thinner section. FIG. 21D ADF-STEM image of ex-situ heated $MoS_2$ after 10 minutes spending at 750° C. FIG. 21E It leads to faceted (triangular or hexagonal-shaped) features captured at higher magnification STEM image. A few portions of the $MoS_2$ layers become completely decomposed into Mo nanocrystals, as shown in f, this is further confirmed by another sample, g ex-situ heated at 800° C. for 5 minutes. The SAED pattern confirms the transformation into Mo nanocrystals.

FIG. 26 illustrates exemplary $MoSe_2$ quantum particle formation at 650 deg C.

(FIG. 28A) Pristine fewlayer $MoS_2$ and an atomic force microscopic (AFM) image showing the morphology and the corresponding height profile (— 3.5 nm thick) at the bottom; (FIG. 28B, FIG. 28C) After ex-situ rapid thermal annealing (for 45 sec only at 800 C) of the same fewlayer $MoS_2$ analyzed through the AFM height images and corresponding thickness profiles at two different region respectively. Shaded green marked region in FIG. 28A correspondence to a thicker $MoS_2$ that did not transform in the time period shown here.

DETAILED DESCRIPTION OF ILLUSTRATIVE EMBODIMENTS

Figures 3A, 3B, 3C:
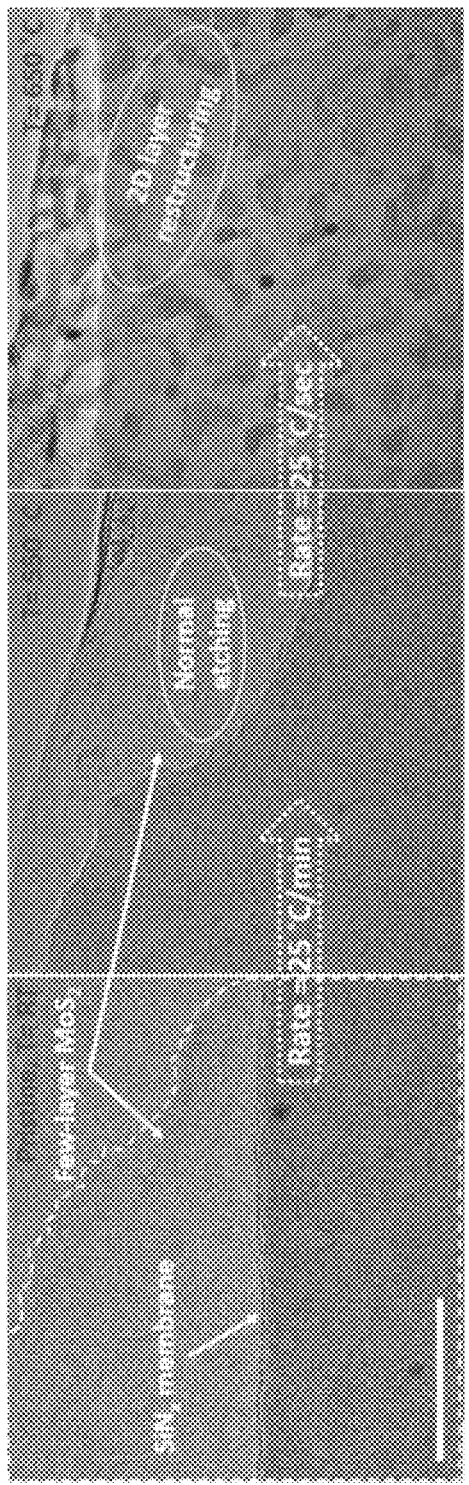
FIGS. 3A-3G provide real time observation of few-layer $MoS_2$ disintegration and subsequent coalescence using BF-TEM imaging. (3A) Pristine few-layer $MoS_2$ at room temperature and the corresponding (3B) formation of small etched regions (pits) upon slow (~25° C./min) heating to 550° C. (3C) Complete disintegration of same few-layer $MoS_2$ sample when ramped to 650° C. at a fast heating rate (~25° C./sec), (3D-3G) Sequential snapshots of bright field (BF)-TEM images taken at different times showing further coalescence of the disintegrated $MoS_2$; (Scale bars: 3A: 50 nm, 3D: 10 nm).

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Two-dimensional (2D) transition metal dichalcogenides (TMDCs) have been the subject of sustained research interest due to their extraordinary electronic and optical properties. They also exhibit a wide range of structural phases because of the different orientations that the atoms can have within a single layer, or due to the ways that different layers can stack.

Here is reported a unique study involving direct-visualization of structural transformations in atomically-thin layers under highly non-equilibrium thermodynamic conditions. These transformations are probed at the atomic scale using real-time, aberration corrected scanning transmission electron microscopy and observe strong dependence of the resulting structures and phases on both heating rate and temperature. A relatively fast heating rate (e.g., 25° C./sec) yields highly ordered crystalline hexagonal islands of sizes of less than 20 nm which are composed of a mixture of 2H and 3R phases. However, a relatively slow heating rate (e.g., 25° C./min) yields nanocrystalline and sub-stoichiometric amorphous regions. These differences are explained by different rates of sulfur evaporation and redeposition. The use of non-equilibrium heating rates to achieve highly crystalline and quantum-confined features from 2D atomic layers present a new route to synthesize atomically-thin, laterally confined nanostructures and opens new avenues for investigating fundamental electronic phenomena in confined dimensions.

Two-dimensional nanomaterials have received significant attention due to the wide range of exciting properties that they exhibit[1]. Transition metal dichalcogenides (TMDCs) have garnered particular interest due to their ability to be utilized in novel electronic device applications[2,3]. There have been several studies investigating the effect of heat treatments on the structural properties of these systems, but to date these have largely focused on amorphous to crystalline transformation kinetics, point defect kinetics, and dislocation kinetics under equilibrium conditions from ranging ambient to elevated temperatures[4,5]. Among 2D materials, the transition metal dichalcogenides (TMDCs) of Mo and W can exist in multiple phases like 2H, 1T and 1T', few of them induced by atomic distortions. Furthermore, additional phases can be formed.[6-9]

The 2H phase is the most thermodynamically stable phase, while the 1T phase and 3R phases are metastable and revert back to the 2H phase over time, or upon application of some form of energy that allows them to overcome the associated activation barrier[7,1].

Despite the fact that several studies regarding phase identification and evolution have been conducted, the nucleation and formation of metastable phases is still a topic of major debate and discussion[11-15]. Thus far, in-situ electron microscopy studies of TMDCs (such as $MoS_2$, $WS_2$, etc.) have largely focused on observations of the kinetics of individual point defects[16-19]. However, with the rapid growth of interest in the optical, electronic, and mechanical properties of TMDCs[20-22], several studies have used in situ scanning transmission electron microscopy (STEM) to document structural transformations under equilibrium conditions[5,23-27]. In addition, some observations of in-situ heterojunction formation and growth have also been made in the same class of materials[28,29]. These nanoscopic investigations have shown that defects and vacancies form due to the application of multiple types of external stimuli, along with the dynamic migration of transition metal and chalcogen atoms towards favourable grain boundary formations[30].

There is, however, a lack of understanding on how processing conditions impact atomic scale structure and phase evolution in confined dimensions, including how they lead to the formation of new, metastable phases[7,8,31]. Here is studied the effect of equilibrium vs. non-equilibrium diffusion conditions during the heating of exemplary atomically thin 2D $MoS_2$ sheets. (It should be understood that although $MoS_2$ results are provided, those results are not limiting, and the present disclosure should not be understood as being limited to $MoS_2$ or any other particular TMDC.)

One can find that the effect of heating rate on the morphology of bilayer/few-layer $MoS_2$ is consistent with the equilibrium bulk binary phase diagram of Mo and $S^{32,33}$. One can see that stoichiometric $MoS_2$ can phase-separate at low temperatures (T<500° C.) into a two-phase region of Mo+$MoS_2$ if the sulfur concentration is reduced. At higher temperatures (500° C.<T<1000° C.), the same process leads to a mixture of $Mo_2S_3$ and 3R phase of $MoS_2$. Furthermore, if the sulfur content is reduced to below 60 atomic percent, a mixture of Mo and $Mo_2S_3$ forms. Some have reported that sulfur vacancies, having a low formation energy, are the dominant defect species in few-layer $MoS_2$[34], and that annealing in the 500° C.<T<1000° C. range can lead to loss of sulfur atoms on a time scale of just 30 minutes[35]. Moreover, the general phenomena of melting point depression in quantum-confined materials relative to their bulk counterparts is well known[36,37]. Based on these concepts, it is proposed here (without being bound to any particular theory) that changing the heating rate of a bilayer $MoS_2$ sample can be used as a proxy to tune the sulfur concentration and change the material structure and morphology of a stoichiometric crystal after synthesis. Direct observation of atomic level diffusion indicates the different crystalline states across the entire thermal diffusion process. Lateral heterophase formation along with statistical observation of particle evolution provides a new pathway for materials engineering in the quantum mechanically-relevant size regime[38].

Results

Phase Transformation Processes in Equilibrium Vs Non-Equilibrium Heating Conditions Schematics presented in FIG. 1A show the thermal diffusion process in 2D layered $MoS_2$ crystals, mechanically exfoliated from bulk crystals, when subjected to two different heat treatments: 1) localised, fast heating rates, using embedded heating elements on a chip, which create highly non-equilibrium thermodynamic conditions, and 2) global, slow heating in an equilibrium environment in a hot-walled reactor.

To accomplish these experiments and visualize their atomic structure, exfoliated $MoS_2$ layers were transferred to heater-embedded TEM grids (Hummingbird Scientific)[39]. HAADF-STEM images in FIGS. 1B and 1e represent the as-prepared 2D $MoS_2$ layer before thermal treatment, while FIGS. 1C and 1f show the transformed $MoS_2$ after thermal treatment in non-equilibrium and equilibrium conditions, respectively. Because a 200 kV accelerating voltage was used, one can (without being bound to any particular theory) consider the possibility of beam induced transformations in 2D $MoS_2$ layers at the transformation temperature.

After cooling the sample to room temperature, regions that were not exposed to the electron beam were systematically investigated, and it was found that the disintegration process was identical throughout the sample. This indicates that the primary source of the observed structural changes is the applied thermal stimulus and not the electron beam. Similar results for another set of samples are shown in FIG. 7 along with completely unexposed regions after disintegration, FIG. 8 to confirm the reproducibility of our experiments. In the case of non-equilibrium (fast) heating, one can observe discrete disintegration of continuous, atomically thin and uniform layers of $MoS_2$ into highly crystalline nanostructures or nanoparticles with lateral dimensions of less than 20 nm, which is within the regime of electronic quantum confinement[38].

FIG. 1D presents examples of nanoscale islands of $MoS_2$ that form after fast ramping of the flakes shown in FIG. 1B to an elevated temperature (700° C.). Conversely, a slow increase in temperature results in decomposition of the stoichiometric, single crystalline $MoS_2$ layers into amorphous structures. The sections below discuss the detailed mechanisms and structures observed in each case and correlate them with theoretical insights which account for different evaporation rates of sulfur from the structures.

Macroscopic Thermal Diffusion in Non-Equilibrium Conditions and the Restructuring of Heterophase Formation While studies of phase evolution through heating or beam induced transformation have been previously carried out on 2D layered chalcogenides, those studies have been limited to small area, atomic scale investigations which offer limited insight into dynamic phenomena. Large area analysis and observations at different length scales using electron microscopy are lacking. For the case of fast heating, this is shown in FIG. 2A-2B where a magnification series of images show how the disintegrated portion of a $MoS_2$ flake taken through a rapid heating cycle develops, including analysis of its atomic structure and crystalline order. It is clear from these images that upon rapid heating the $MoS_2$ single crystal flake disintegrates into highly crystalline, nanosized islands that retain hexagonal symmetry. This is also evident from the selected area electron diffraction (SAED) patterns in FIGS. 2A-2B.

Figure 8:
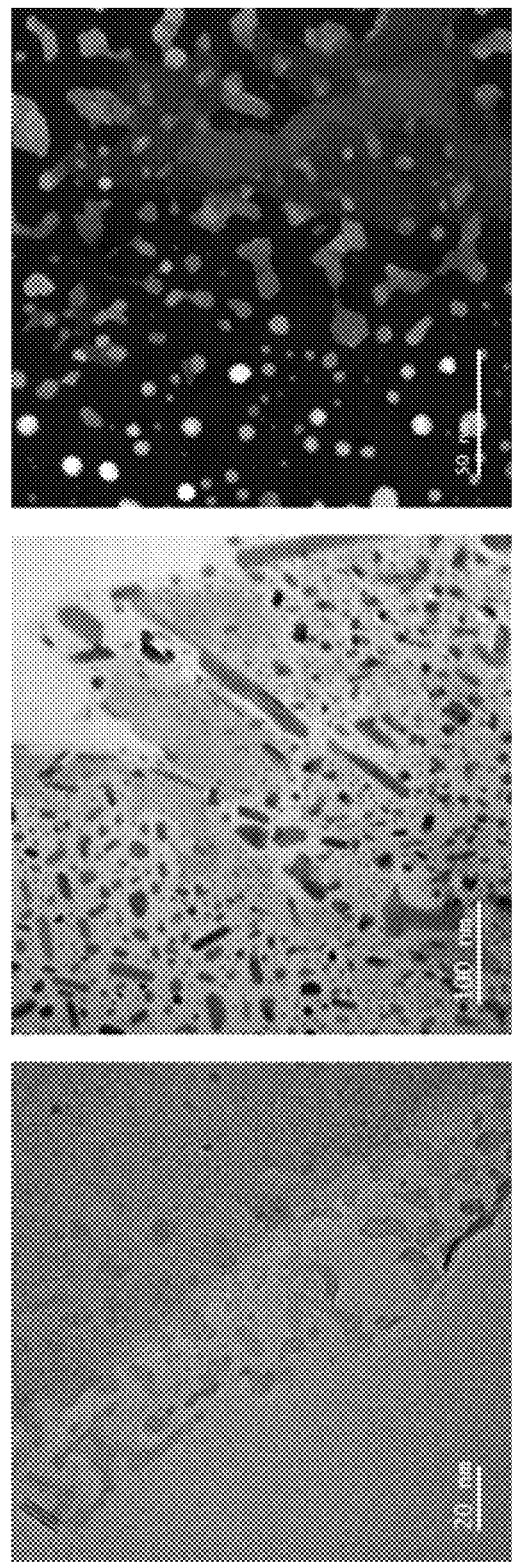
FIG. 8 provides three different TEM/STEM images from three different samples belong to regions that were not irradiated by the electron beam during the non-equilibrium disintegration process.
Figure 9A:
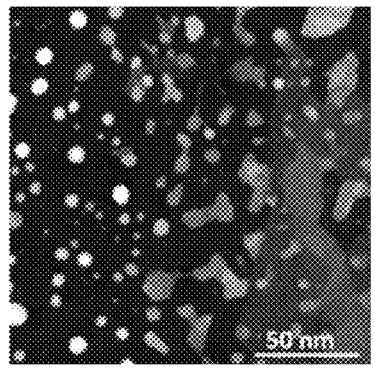
FIGS. 9A-9D illustrate in-situ heated bilayer $MoS_2$ in a non-equilibrium environment and corresponding magnified HAADF-STEM imaging of polymorphic-phases. (9A, 9B) Low magnified ADF-STEM images after in-situ disintegration at 700° C. in non-equilibrium conditions (25° C./sec) and corresponding (9C) an atomic resolution HAADF-STEM image. (9D) The highlighted portion shows restructured polymorphic phases, 3R (different thickness) from the initial 2H phase of bilayer $MoS_2$.
Figure 9B:
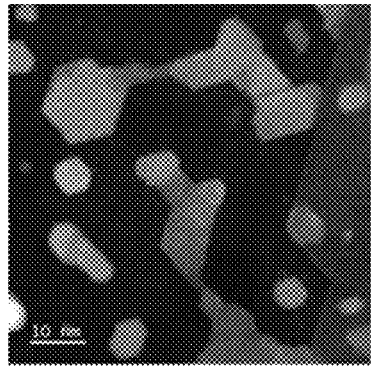
Figure 9C:
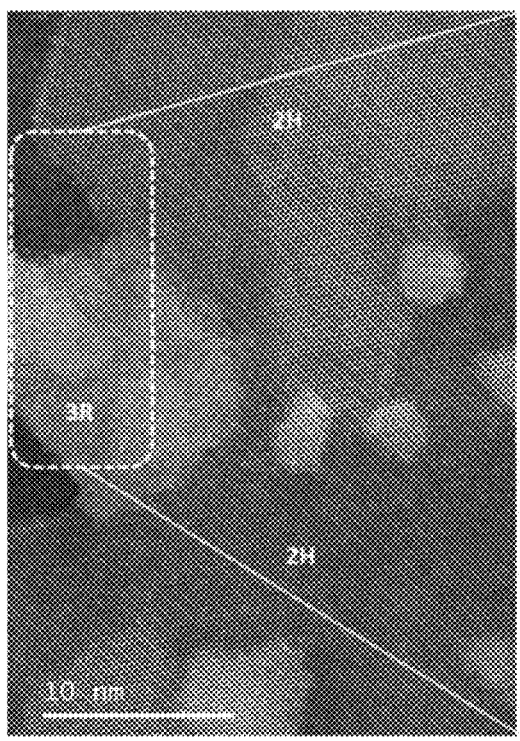
Figure 9D:
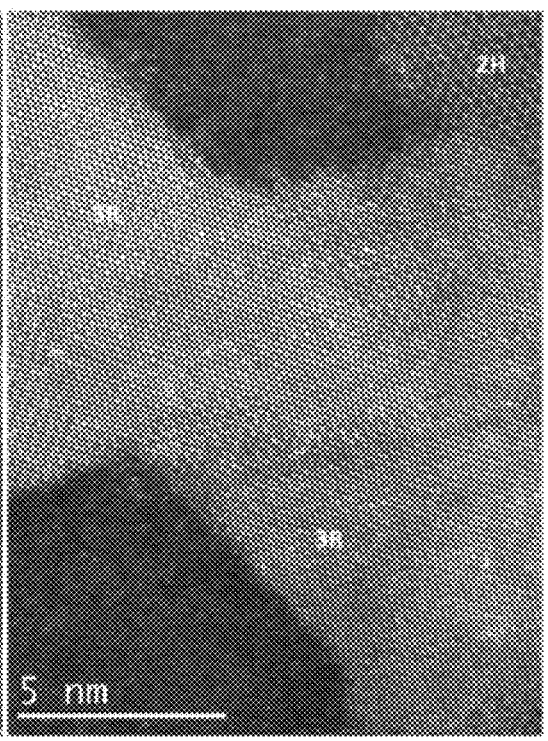
Figure 10A:
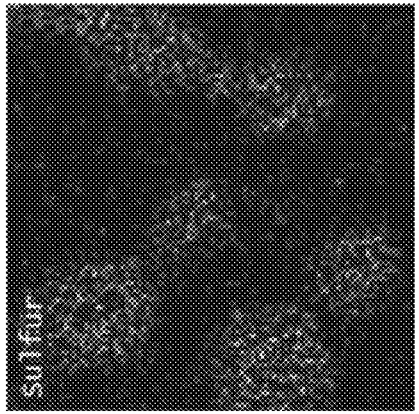
FIGS. 10A-10D provide EDS maps and spectrum of the crystalline disintegrated $MoS_2$. (10A) HAADF STEM image and corresponding elemental identification of (10B) Molybdenum (Mo) and (10C) Sulfur (S), the full spectrum is presented in (10D); Mo-L edge and S—K edge lie at 2.29 keV and 2.31 keV respectively, they overlap due to the available resolution of the EDS detector (0.125 keV @ Mn Kα).
Figure 10B:
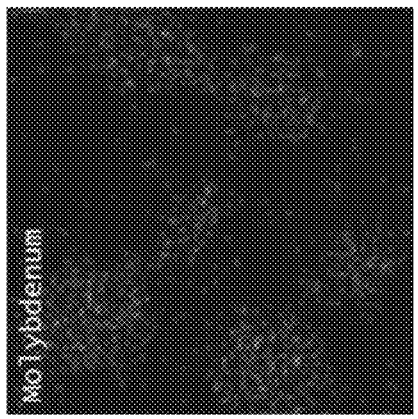
Figure 10C:
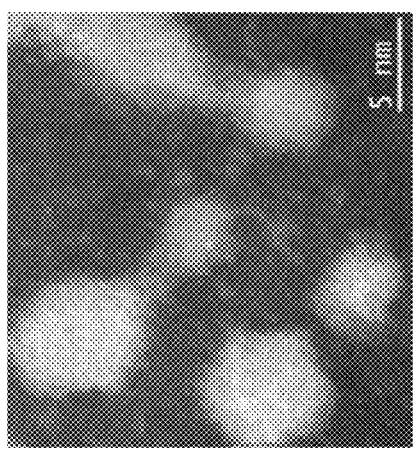
Figure 10D:
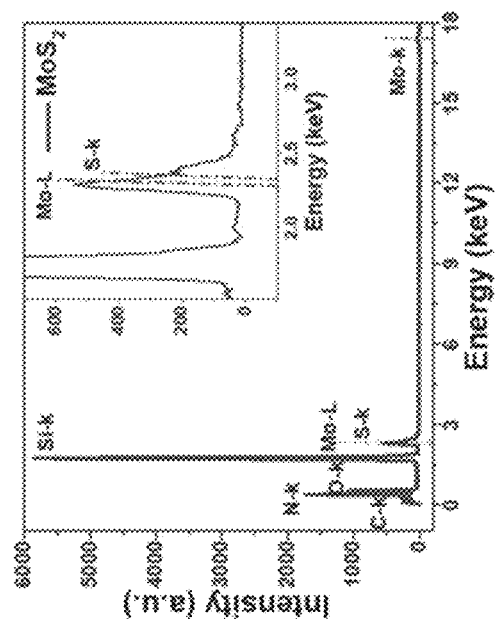
Figure 11:
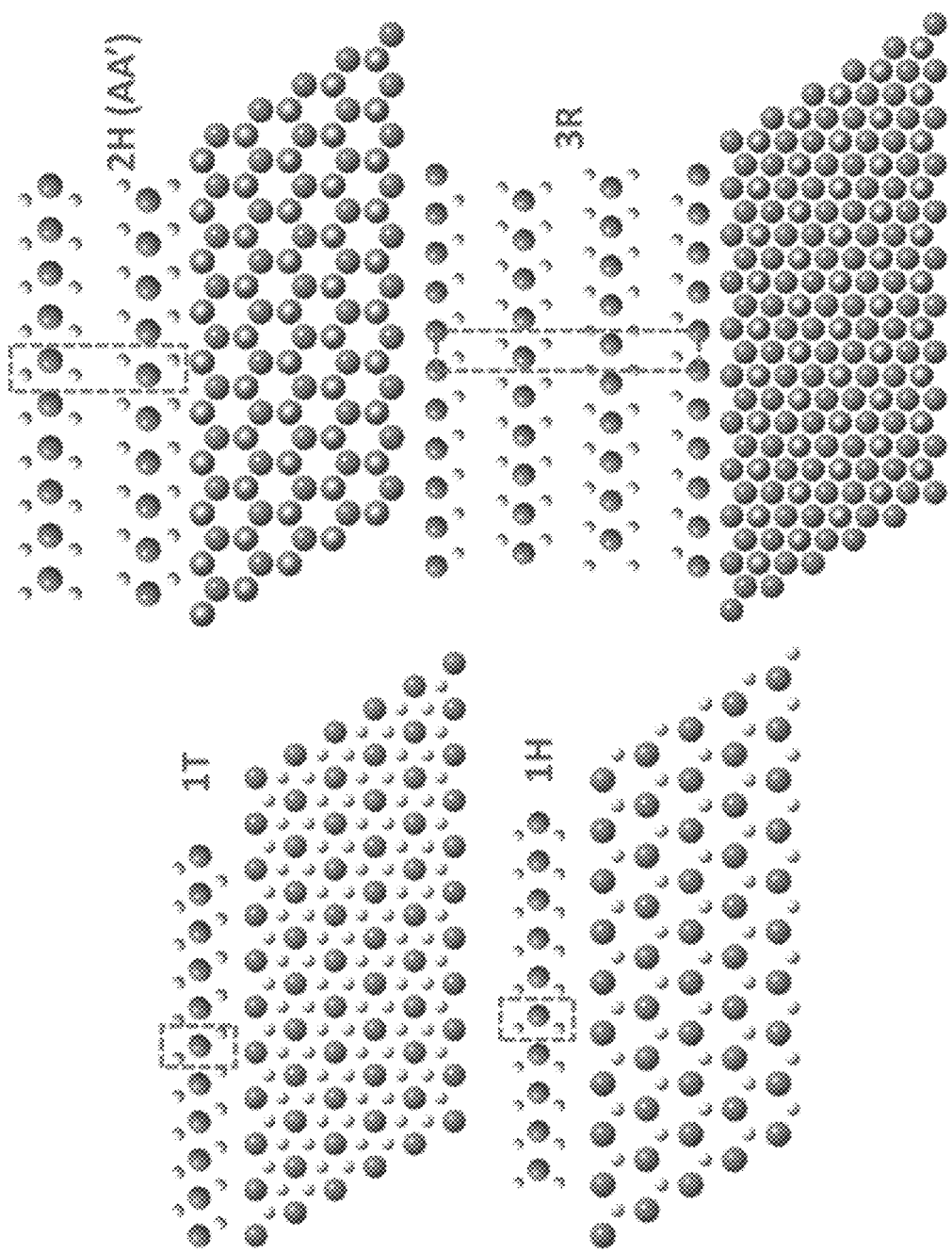
FIG. 11 provides structural models; e.g., a structural model (along a and c axes) with marked unit cell representation extracted using Crystal Maker for different polymorphic phases of $MoS_2$ according to the respective lattice parameters and space-group. This structural model allows us to directly determine and visualize the polymorphic phases in the atomic resolution HAADF-STEM images. Without being bound to any particular theory, TMCDs such as $MoS_2$ form different phases depending on their stacking. This can lead to different electronic structures, and interfaces can lead to new band offsets and device configurations.
Figure 13D:
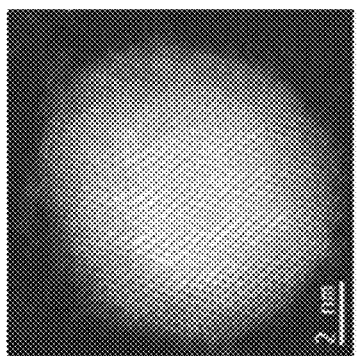
FIGS. 13A-13E provide STEM imaging of disintegrated quantum dot-like particles.
Figure 13E:
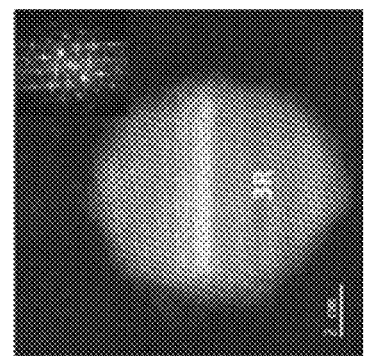
Figure 13B:
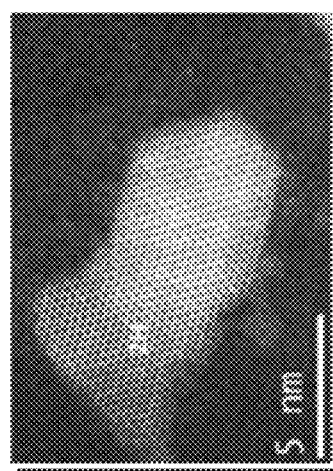
Figure 13C:
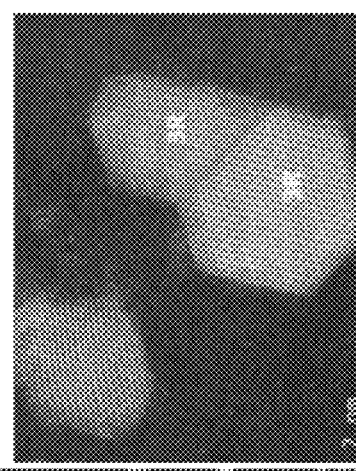
Figure 13A:
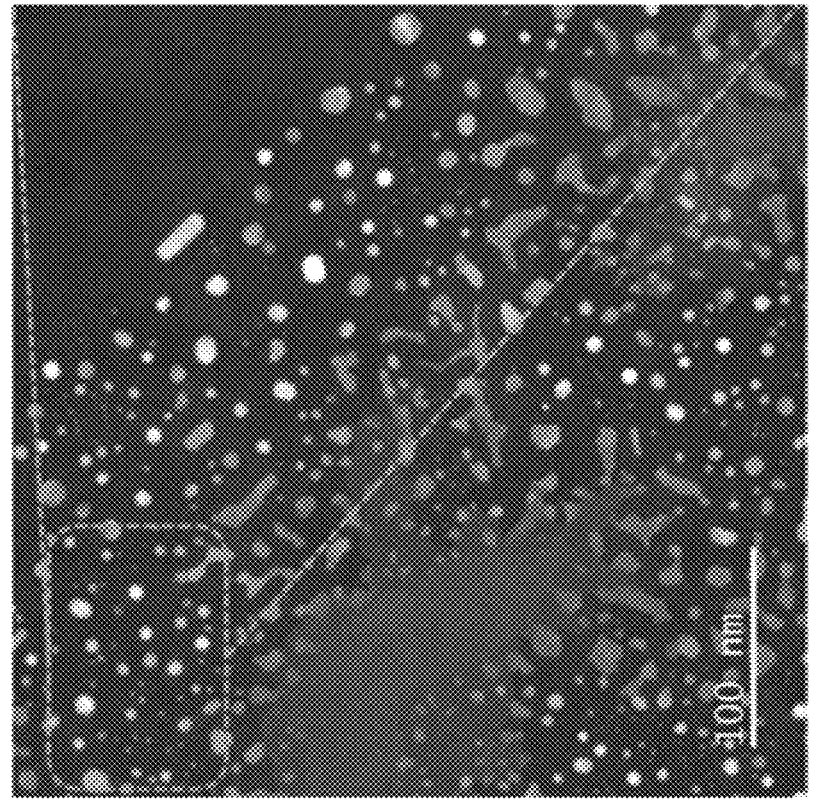
Figure 15A:
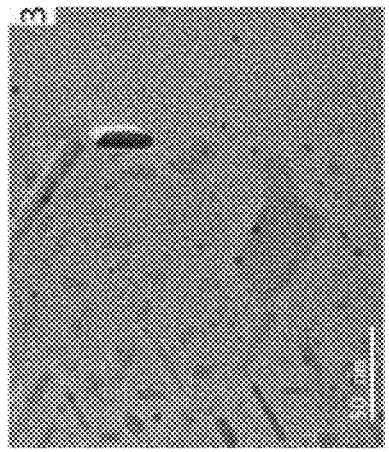
FIGS. 15A-15F: Sequential BF-TEM images captured following rapid sample disintegration at the temperature of 650° C.
Figure 15B:
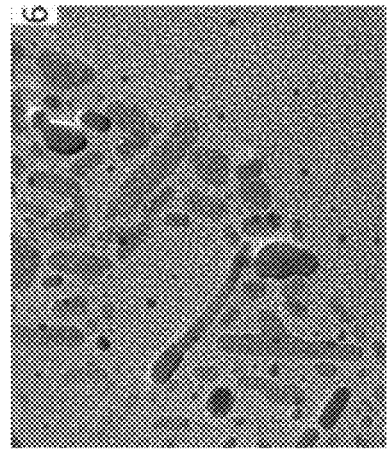
Figure 15C:
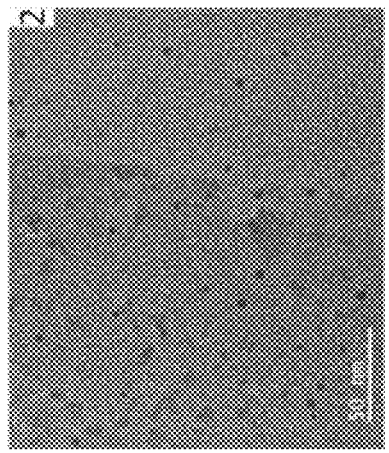
Figure 15D:
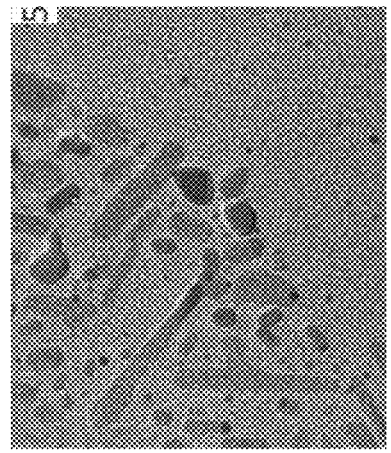
Figure 15E:
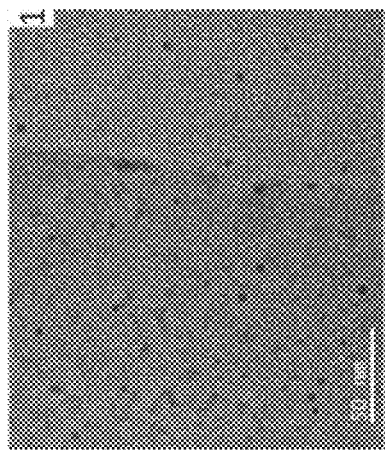
Figure 15F:
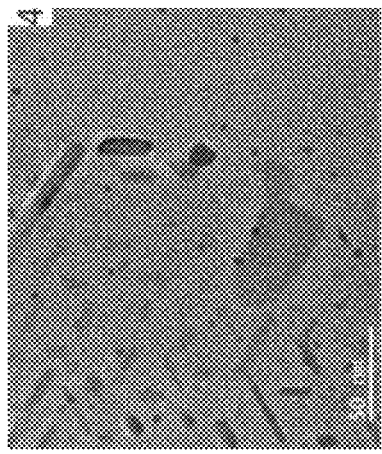

Additional atomic resolution STEM images and compositional analysis via energy dispersive X-ray spectroscopy (EDS) are provided in FIG. 8 and FIG. 9. In addition to observing the highly ordered nature of the disintegrated $MoS_2$ crystal, one can also observe polymorphic phase formation, as highlighted in FIGS. 2B and 2D. SAED and EDS analysis indicated that the crystal symmetry of the 2H phase remained intact. FIG. 2B clearly shows the formation of different phases and structural rearrangements of $MoS_2$ nanostructures, determined to be the 2H and 3R phases.

FIG. 2C presents image simulations (QSTEM package)[40] using the same experimental parameters to replicate the observed contrast and structural arrangements seen in the experimental HAADF STEM images. Only the 2H and 3R phases match with the experimentally observed contrast, and one does not see formation of any other phases, such as 1T and 1T', elsewhere. However, regions interconnecting the 2H and 3R phases were found which appear as transition states (FIGS. 2B and 2D). Additional analysis of structural arrangement of atoms and stacking order of planes for different phases in these transition regions is provided in FIGS. 2D and 2E. Atomically sharp heterojunction formation is observed at the intersection of the 2H and 3R regions (FIG. 2D) in partially disintegrated regions, suggesting that the equilibrium 2H phase transforms into a metastable 3R phase in certain regions following a fast-thermal treatment.

Without being bound to any particular theory, one can speculate that the heat supply and dissipation across the flake is non-uniform and the partially disintegrated regions occur when the top atomic layers of the crystal have already disintegrated but the bottom layers have yet to disintegrate at the time of termination of the experiment. One can observe that the occurrence of the 3R phase is strictly limited to fully/partially disintegrated regions of the original 2H-phase continuous crystal. The continuous regions of the original crystal that do not disintegrate all remain in the pure 2H phase, while the partially disintegrated islands show a mixture of 2H and 3R phases (FIG. 12). One can hypothesize that the 3R phase is formed and stabilized in this case as result of restacking and vertical mass transport of the van-der-Waals layers during fast thermolysis of $MoS_2$[9].

Atomic scale line profiles along [1 1 $\bar{2}$ 0] of the two phases have also been plotted in the inset of FIG. 2E. This resolves the atomic locations (peak placement) and chemistry (peak height, equivalent to $\Box Z^2$ contrast) in the two different structures. Additional images and analysis related to the structural model, distributions of 2H and 3R phases, as well as thickness variation after disintegration are provided in FIG. 11, FIGS. 12A-12C, and FIGS. 13A-13E.

Coalescence and Epitaxial Alignment

The above discussion describes the structure of the disintegrated phase upon rapid heating. While this provides new insight into the structural evolution, the dynamics of the transformation are difficult to capture in real-time measurements. This is particularly challenging since, upon reaching the desired temperature, layer disintegration is very rapid and occurs over the acquisition time of only two or three STEM images. A sequence of bright field TEM images was collected at different times (FIG. 3), at a fixed temperature (650° C.) using a high-frame rate camera (GATAN OneView IS)[41]. The sample was slowly heated from room temperature to 550° C. and then rapidly heated from 550° C. to 650° C. and observed in-situ.

Figures 3D, 3E, 3F, 3G:
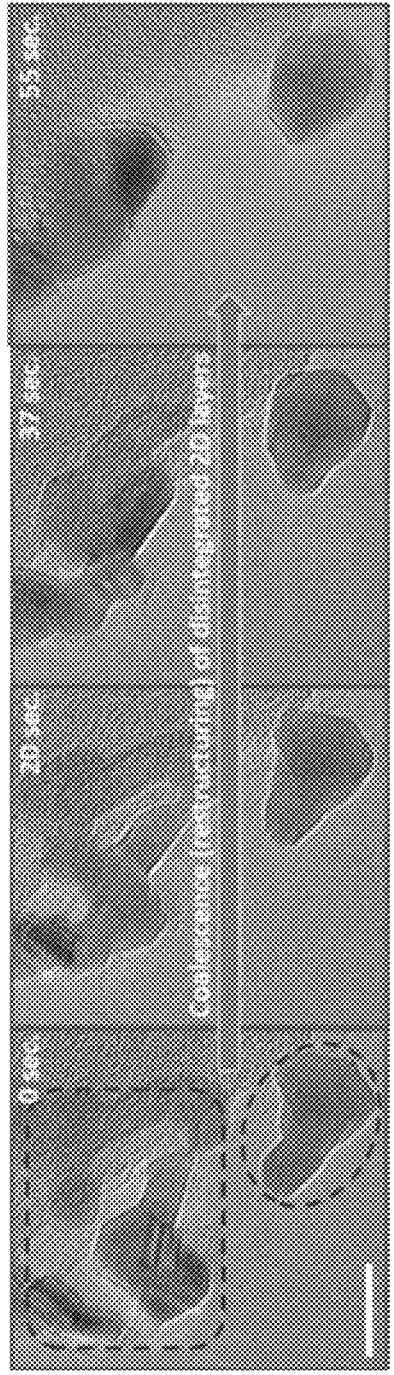

FIGS. 3A and 3B show representative images of few-layer $MoS_2$ when heated to 550° C. at a slow ramping rate (25° C./min). Small etch pits form, (FIG. 3B) which suggests slow evaporation of chalcogen atoms and associated defect creation in the $MoS_2$ lattice, see FIG. 14 for more details. Upon ramping at an accelerated rate of 25° C./sec from 550° C. to 650° C., one can observe a transformation of the MoS$_2$ sheet into disintegrated nanoscopic domains or islands (FIG. 3C and FIGS. 15A-15F). The non-irradiated regions (i.e. those not exposed to the electron beam) were examined, and one finds that the MoS$_2$ sheet undergoes a similar disintegration process after reaching 650° C.

Further analysis of sequential phase contrast TEM images (FIG. 3D-3G), shows the different stages of coalescence of the MoS$_2$ nanostructure when held at a constant elevated temperature. FIG. 3D-3G is a time series of BF-TEM images from the in-situ video taken from outside the continuous e-beam exposed region and recorded just after reaching the transformation temperature, 650° C. It is worth noting that with rapid heating these nanostructures spontaneously form on a time scale that is less than the 10 msec/frame of the camera. In contrast, their slow evolution when held at a constant temperature can be captured. As seen in FIG. 3D-3G, after 55 seconds, multiple smaller crystallites of MoS$_2$ have coalesced into a larger crystal of appx. 10 nm in diameter with a hexagonal shape.

For FIG. 3D-3G, the coalescence is prominently visible in the bottom right corner of the image (blue dashed oval). One can speculate that the initial disintegration mechanism breaks down the continuous few-layer thick MoS$_2$ into regions with geometrical shapes based on energetically favourable facets. As the sample is held at an elevated temperature over time, partial etching ensues resulting in the loss of sulfur atoms via evaporation and the migration of atoms overall. With time, newly formed islands further restructure to reduce their surface energy leading to strongly faceted particles.

FIGS. 3D-3G show that the island extends only slightly in the lateral dimension as the shape evolves, and that the thickness increases. This is evident from the decreased prominence of lattice fringes and darker contrast in the centre of the island. These observations are consistent with well-established theories of particle coalescence, wherein surface diffusion at the point of contact drives restructuring to reduce the total local curvature[42].

This thermally driven spontaneous disintegration into nanoscale islands occurs in both free standing as well as substrate supported crystals, as seen in FIG. 3C. While there appears to be a partially connected network of particles in the free-standing region, on the amorphous non-epitaxial SiN$_x$ membrane support the particles are isolated and separated into "quantum dot" sized islands (see FIGS. 13A-13E for more images). The high degree of crystallinity of the lattice both during coalescence and in the sub-10 nm size islands is remarkable and has not been seen before via chemical exfoliation or bottom up synthetic routes for Mo and W chalcogenides. Van der Waals interactions, though weak in nature, can influence growth and epitaxial alignment of the nanoscale islands. Similar van der Waals epitaxy has been exploited for aligned growth of heterostructures on 2D layered materials, as a well as TMDCs growth on standard substrates[43-49].

Figure 4A:
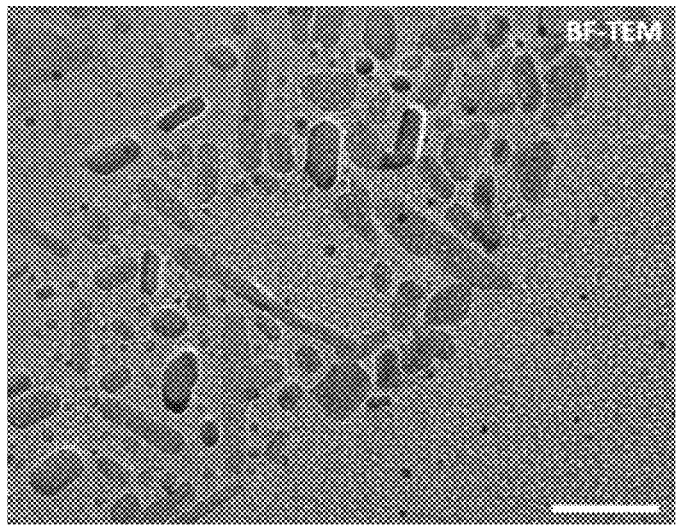
FIGS. 4A-4D provide epitaxy and orientation during the disintegration of few-layer $MoS_2$ on in-situ microfabricated heating chip. (4A) Large area BF-TEM image of the disintegrated portion of $MoS_2$ where a portion of the flake has completely disintegrated. (4B) Partially disintegrated $MoS_2$ with a supporting, continuous layer of $MoS_2$ underlying the islands, leading to an epitaxial alignment of the islands over the continuous single crystalline layer. (4C) Continuous bilayer $MoS_2$ disintegrated at 700° C. upon rapid heating shows islands on top of continuous regions as well as fully disintegrated regions. Inset presents an atomic resolution image demonstrating epitaxial alignment in the partially disintegrated region and randomly oriented islands in the completely disintegrated region. 4D Quantitative measurement of island size and shape after the non-equilibrium diffusion. The lines are color coded to island shape in the legend which corresponds to the shape factors of regular polygons with equivalent perimeters; (Scale bars: 4A, 4B, 4C: 50 nm, c-inset: 5 nm).

Furthermore, upon rapid heating, one can observe an interesting epitaxial relationship between fully and partially disintegrated regions of few-layer MoS$_2$ deposited on an amorphous support layer (SiN$_x$), which is detailed in FIGS. 4A-4D. High magnification TEM images show that the few-layer MoS$_2$ goes through a layer-by-layer disintegration, followed by coarsening of the 2D layers. FIG. 4A presents a low magnification TEM image that shows that a large portion of the MoS$_2$ layer has fully disintegrated into faceted nanostructures, while a small portion in the top-left corner remains only partially disintegrated.

Figure 4B:
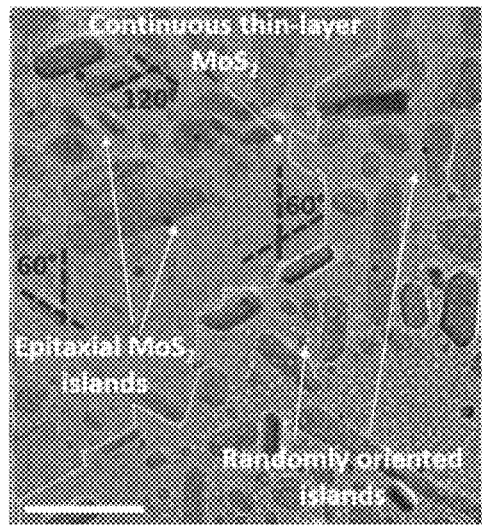

Analysis of the geometric alignment of the nanoscale MoS$_2$ islands indicates that the MoS$_2$ nanostructures in the fully disintegrated region do not exhibit any preferential alignment or epitaxy with one another. However, the islands that sit above a continuous single crystalline MoS$_2$ layer exhibit some preferential alignment (FIG. 4B). One can observe that the fully disintegrated MoS$_2$ nanostructures are transformed into "quantum dot" or faceted nanostructures with random orientations and alignment with respect to one another. In contrast, in the partially disintegrated regions (FIG. 4C inset) the nanoscale islands maintain perfect epitaxial orientation with the remaining continuous MoS$_2$ layer. One can propose (again without being bound to any particular theory) that the disintegration mechanism occurs via point defect formation and aggregation[17,50](FIGS. 6A-6B), which originates by preferential sulfur vacancy formation at the surface furthest from the substrate. These surface sulfur vacancies have a lower formation energy than bulk interior sulfur vacancies[34]. Forming these vacancies primarily at the surface preserves the integrity of vdW interactions between the interior layers, along with the substrate-MoS$_2$ interactions. Since the sample thickness is significantly less than the mean free path for perpendicular heat transport[51], one can expect that quasi-ballistic heat transport perpendicular to the substrate prevents the near-substrate layers from melting and forming a solid-liquid interface first. Although prior study[51] was conducted at room temperature, the temperature of their experiment was high enough to activate all the acoustic modes which dominate vertical heat transfer[52], implying a similar phonon mean free path at high temperature. These perpendicular phonons with a high incidence angle can reflect or scatter diffusely at the top surface, which may lead to coupling with in-plane modes and accelerated point defect formation[53]. Additional characterization details of the nanoscale islands including information regarding their composition is provided in FIGS. 16A-16C.

Figure 4C:
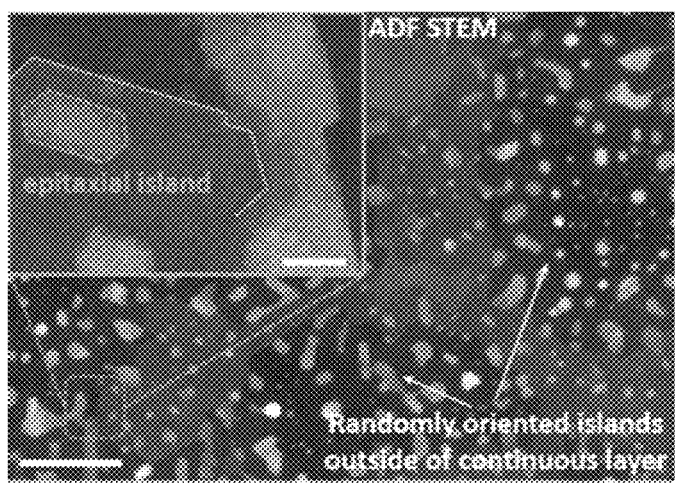
Figure 4D:
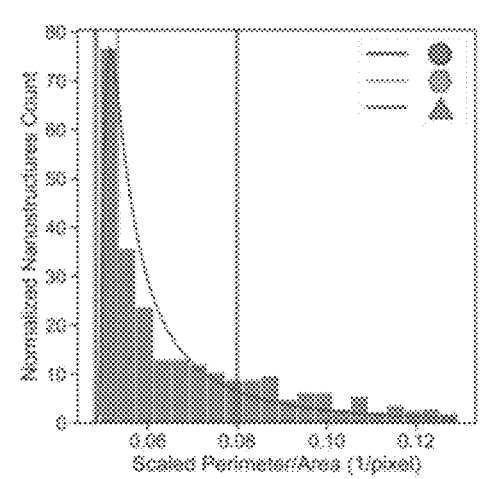

Our large area, in-situ analysis allows for shape characterization of the population of nanocrystalline islands which form after rapid heating and annealing at 650° C. The ADF STEM images such as FIG. 4C are segmented using morphological image filters and a connected components algorithm[45] to identify each nanoscopic island of MoS$_2$ from the void or substrate background. The perimeter and area of each island are then measured in terms of number of pixels on the edge and the interior of the island, respectively. One can then scale the perimeter of each island to the average (260 pixels) and scale the area by the square of the scale factor. This enables us to use the perimeter to area ratio to characterize the shape of each island, removing the effect of dilation. A histogram of this shape factor is plotted in FIG. 4D for the smallest 775 nanostructures, comprising 90% of the islands detected by the automated segmentation algorithm. The lines overlaid for reference correspond to the shape factors of regular polygons with equivalent perimeters, with the circle having the smallest perimeter/area ratio. The regular hexagon and equilateral triangle are also shown since these shapes have been commonly observed in CVD growth experiments of TMDCs[55]. One can see that the majority of the nanoscale islands adopt a shape somewhere between the circle and hexagon, suggesting a rounded hexagonal morphology, broadly consistent with the HAADF-STEM images in FIGS. 4A-4D. The distribution of island shape factors can be empirically fit by an inverse Gaussian function presented in equation (1):

$$f(x, \mu) = \frac{1}{\sqrt{2\pi x^3}} \exp\left(-\frac{(x-\mu)^2}{2x\mu^2}\right); \quad (1)$$

with a shape factor μ of 2.1. A non-normal distribution like this is expected due to the energetic preference for specific edge configurations[56]. The dominance of the hexagonal shape is indicative of a neutral chemical potential environment with a stoichiometric balance and a mixture of chalcogen and metal-terminated edges. Triangular flakes tend to form in extremums of the chemical potential since the edges are either all chalcogen or have a metal-rich zig-zag structure[57]. This is further evidence that the rapid in-situ heating rate preserves the composition of the lattice at the initial $MoS_2$ ratio. This will be discussed in more detail in the discussion section below.

Decomposition and Amorphization of $MoS_2$ Under Slow, Equilibrium Heating

The above sections discuss the structural changes that occur during the rapid heating of 2D $MoS_2$. To isolate the specific effects of the heating rate, a comparative analysis was performed with ex-situ, slow heating of the $MoS_2$ layers on $SiN_x$ membranes. A few prior studies have suggested that slow formation of vacancies due to chalcogen removal and migration at elevated temperatures ultimately leads to the formation of voids. Our observations agree with these earlier reports in monolayer to few-layer $MoS_2$[17,18].

Figure 5E:
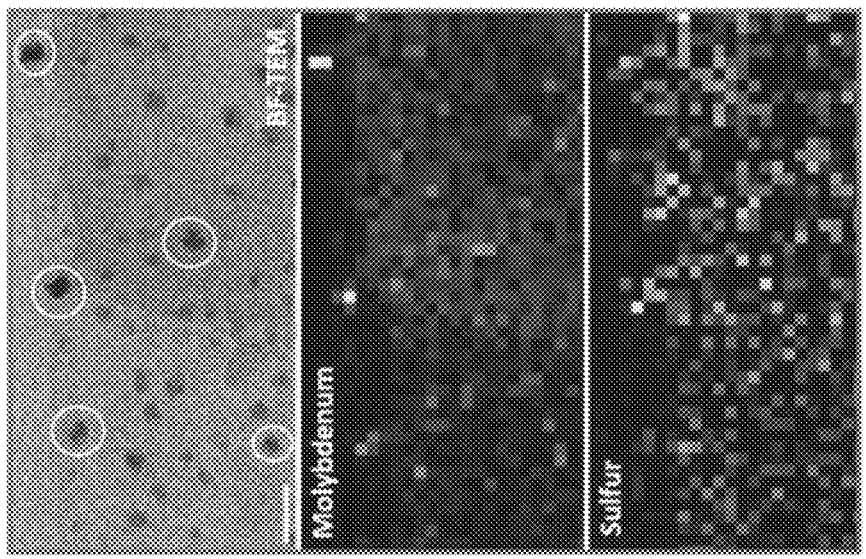
FIGS. 5A-5E provide ex-situ slow-heated (25° C./min) $MoS_2$ layers. (5A) HAADF-STEM imaging of the $MoS_2$ heated to 525° C. for 5 minutes. Triangular etch pits inside the monolayer along-with completely etched edges are evident. (5B) Images from a few-layer $MoS_2$ region heated in these same conditions, and at higher magnification. 5C HAADF-STEM image of few layer $MoS_2$ heated to 550° C. for 5 minutes. Nanocrystalline order is evident in corresponding FFT which shows faint, diffused spots (inset) (5D) Fully decomposed amorphous $MoS_2$ with along with corresponding FFT inset (550° C. for 5-10 mins). FFT patterns (5C and 5D insets) represent the crystallinity of the corresponding region indicated by the green and yellow dashed rectangular regions marked in (5B). (5E) BF-TEM image and corresponding EDX maps of molybdenum (cyan) and sulfur, (yellow). The white circles (top) indicate regions of nanocrystal formation which are highly enriched in Mo, ultimately leading to formation of pure Mo metal crystals; (Scale bars: 5A: 500 nm, 5B: 100 nm, 5C: 5 nm, 5D: 2 nm, 5E: 200 nm).
Figure 5B:
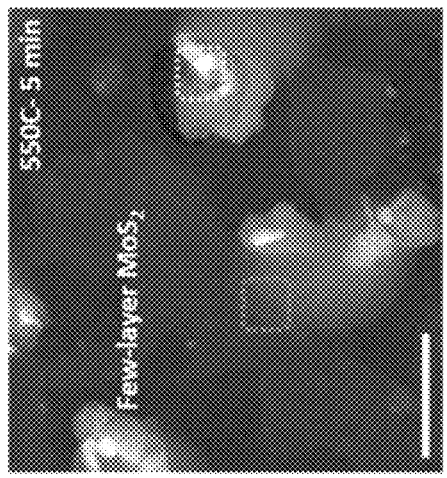
Figure 5D:
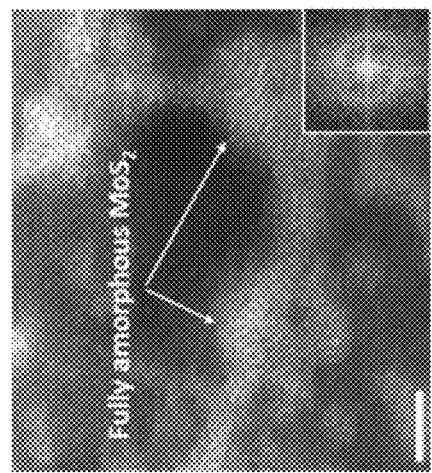
Figure 5A:
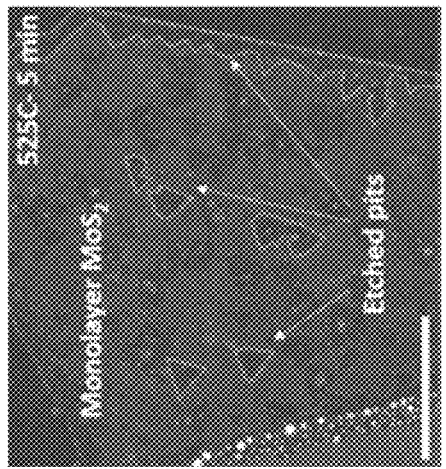
Figure 5C:
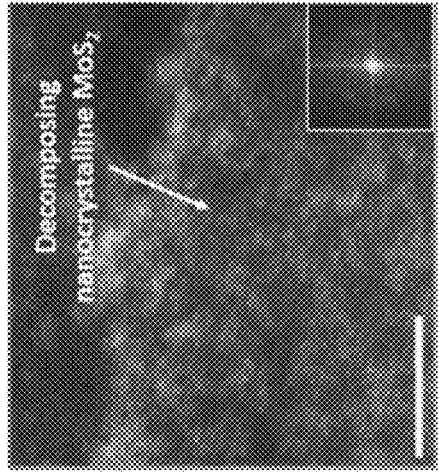

FIGS. 5A-5E present a detailed analysis for describing these phenomena over a wide range of temperatures and over a large area. Ex-situ thermal treatments were carried out in a quartz tube furnace in two different environments (vacuum as well as ultra-high purity Ar gas) using the slow heating rate (25° C./min), as detailed in the methods section. The slow heating rate and the uniformity of temperature inside the tube furnace makes this an equilibrium heating condition, leading to a fundamentally different disintegration process (called decomposition) than the one observed in the non-equilibrium (rapid heating) case. Slow heating to reach elevated temperatures results in formation and migration of vacancies, starting with the ones that have the lowest formation energies as described in the literature[30,59,60]. This results in the formation of nanoscale voids in the layers, as shown in FIGS. 5A and 5B.

Figure 18A:
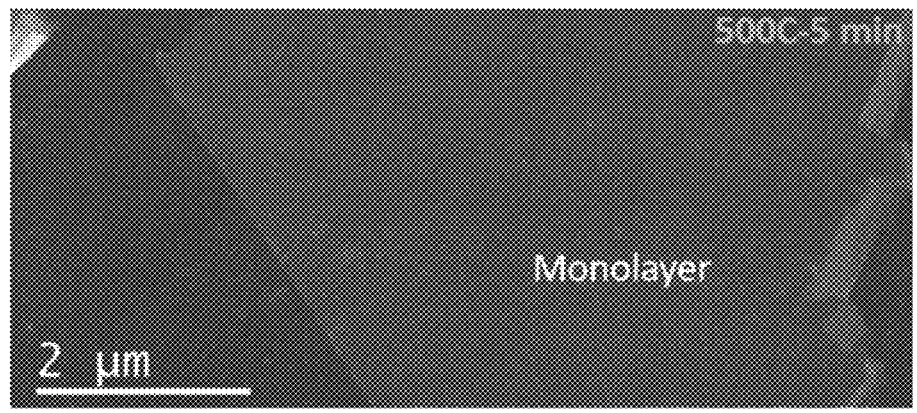
FIGS. 18A-18C provide HAADF-STEM images of $MoS_2$ at different temperatures (ramping rate=25° C./min; temperatures of 550° C., 525° C., and 500° C.) to optimize and analyze the thermal diffusion behavior.
Figure 18B:
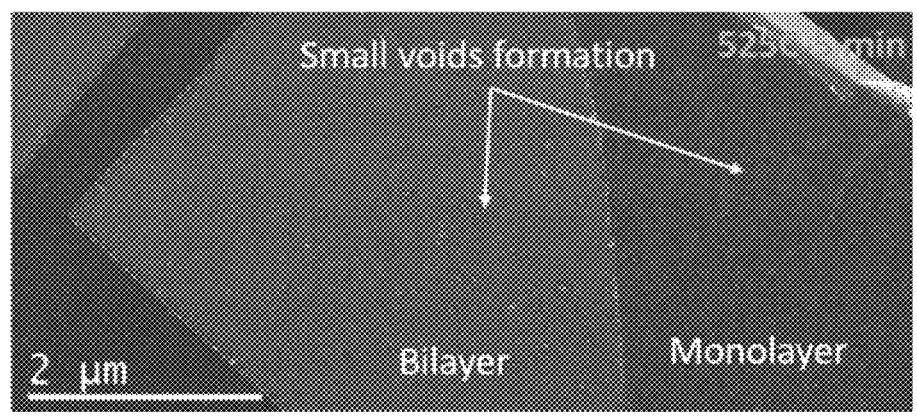
Figure 18C:
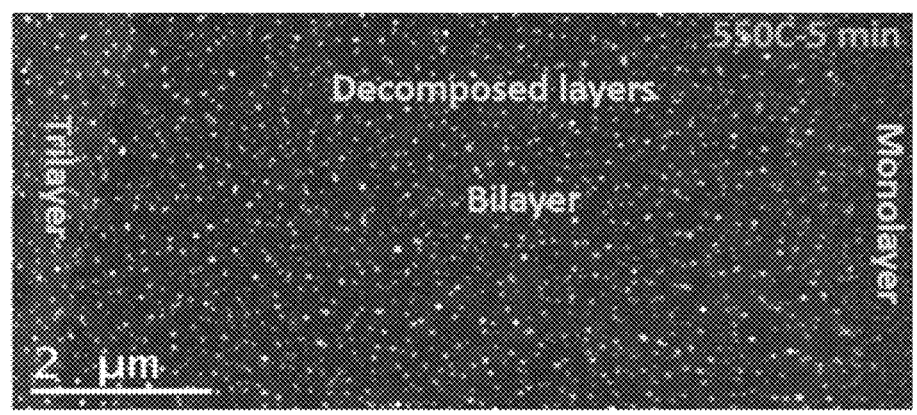
Figure 19A:
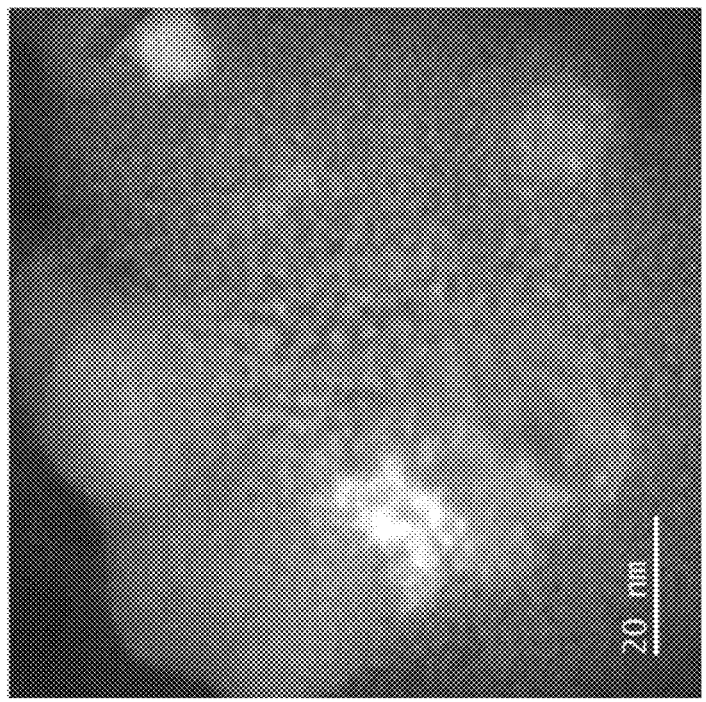
FIGS. 19A-19B: STEM imaging of an amorphous region of $MoS_2$.
Figure 19B:
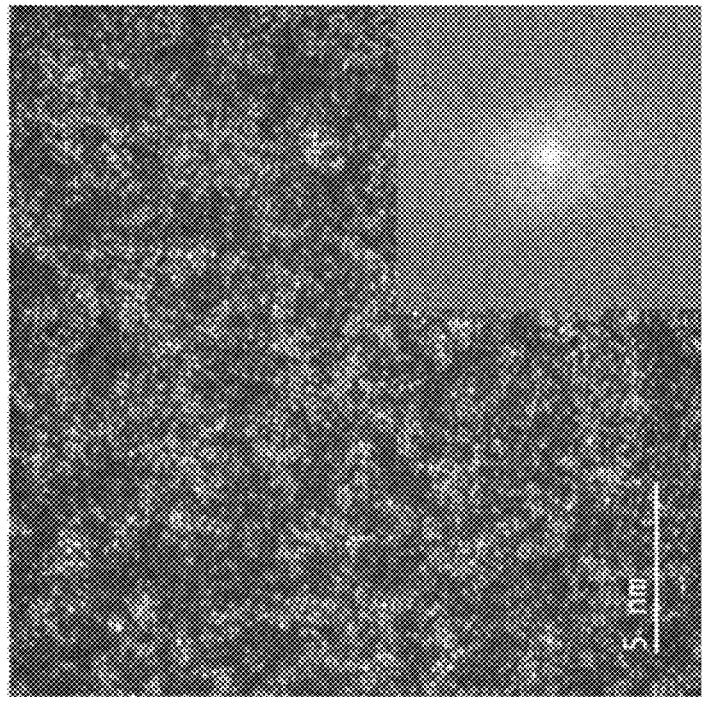

Another distinctive feature of slow-heating induced disintegration is that the affected region is localized to high energy or defective regions such as the flake edges, atomic layer step edges, or previously formed defects. Interestingly, areas adjacent to the affected regions maintain high structural integrity and crystalline quality as seen in FIG. 5B (also in FIGS. 17A-17C). This is in sharp contrast to the rapid heating case where the entire flake/crystal simultaneously disintegrates into nanoscale, faceted and highly crystalline islands of stoichiometric $MoS_2$. Multiple ex-situ experiments have been carried out to determine the required thermal conditions to initiate the disintegration process in $MoS_2$ layers, see FIGS. 18A-18C for more details.

Figure 6A:
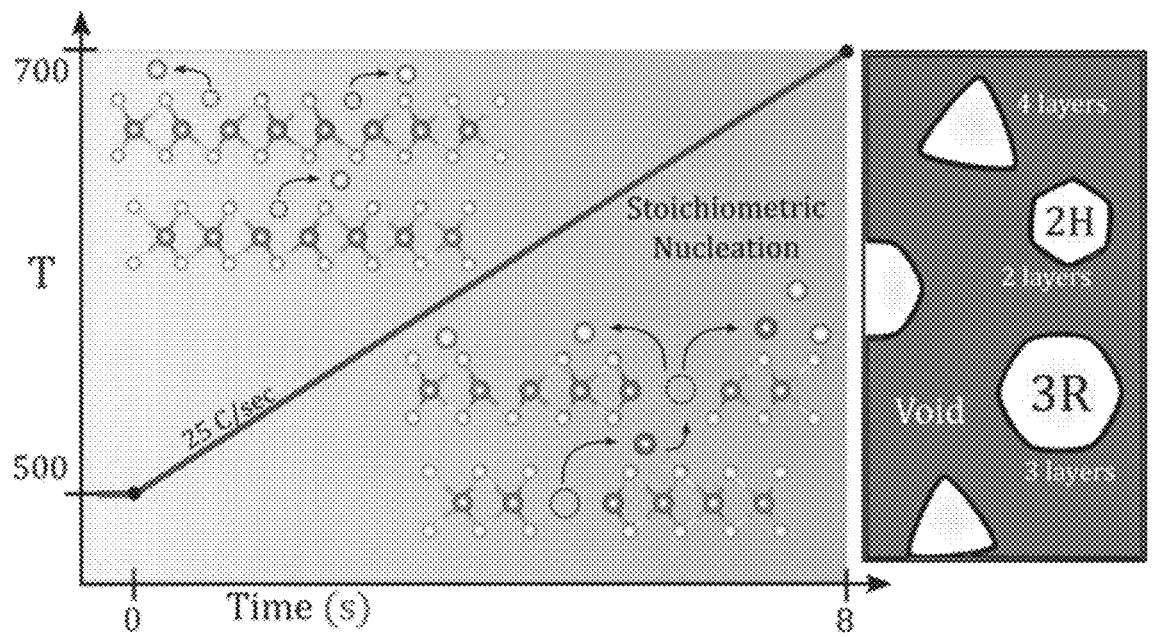
FIGS. 6A-6B provide comparative, mechanistic descriptions of the slow vs. fast heating induced transformations. (6A) Schematic diagram showing that the rapid heating rate leads to the formation of S vacancies and adatoms (yellow circles). Diffusion of S vacancies allows Mo adatoms (purple circles) to recombine with S adatoms before they evolve as volatile elemental products (yellow, $S_2$, $S_8$) and leave the system. (6B) In contrast, a slow heating rate prevents Mo adatom formation before S-compounds become volatile, preventing subsequent reformation of Mo—S bonds. This results in the system being driven into a two-phase regime composed of Mo-rich regions and amorphous $MoS_2$ regions.
Figure 6B:
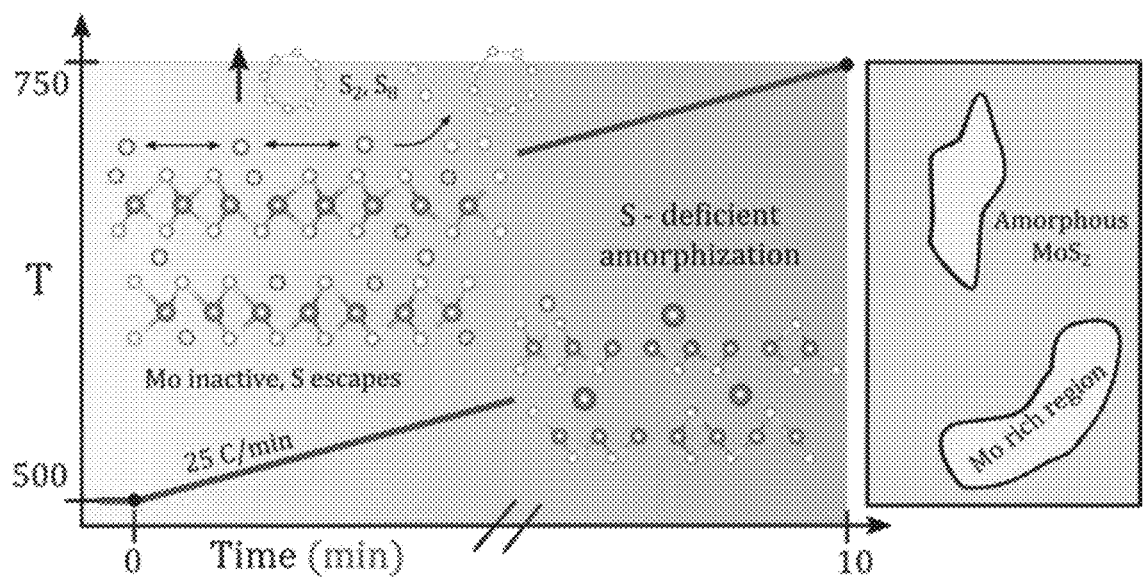
Figure 7E:
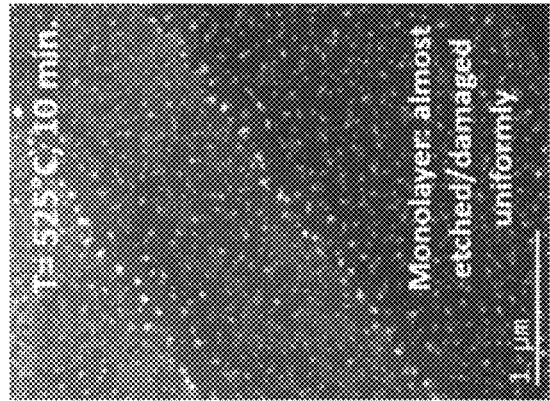
FIGS. 7A-7E provide non-equilibrium vs. equilibrium thermal diffusion processes within 2D $MoS_2$ layers. (7A) ADF STEM images captured during in-situ heating of few-layer $MoS_2$, indicating no changes to the sample at temperatures of 500° C., while (7B) sudden (25° C./sec) temperature increase to 650° C. caused crystalline disintegration into faceted nanostructures. (7C) An optical view of as transferred mono/few-layer $MoS_2$ onto $SiN_x$ membrane of TEM grid utilized for ex-situ heating and corresponding ADF-STEM image of (7D) few-layer $MoS_2$ taken from marked region (white circle) before heating. (7E) ADF-STEM image after ex-situ heating (ramping rate=25° C./min) at 525° C. for 10 minutes under a rough vacuum (~$10^{-3}$ mbar) environment.
Figure 7B:
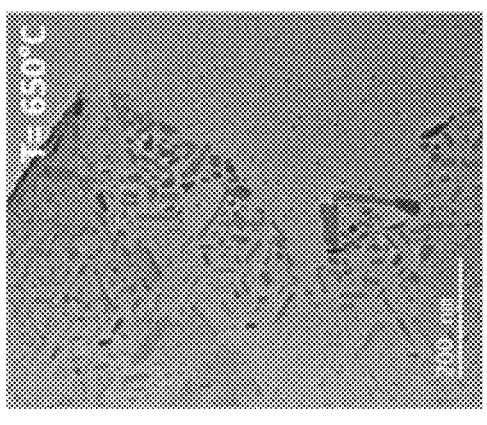
Figure 7D:
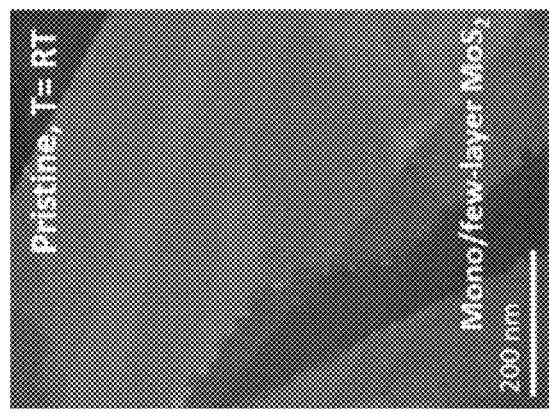
Figure 7A:
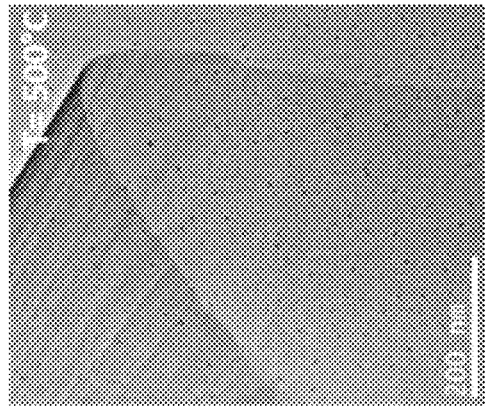
Figure 7C:
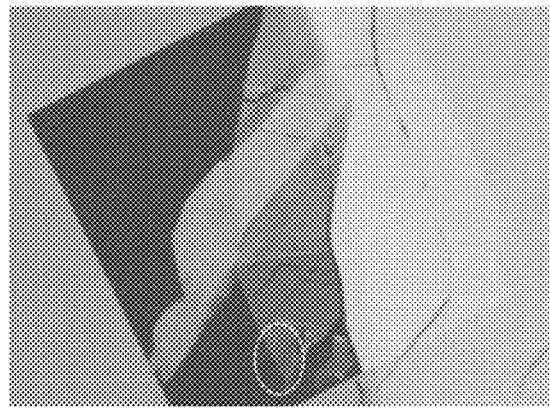
Figure 20C:
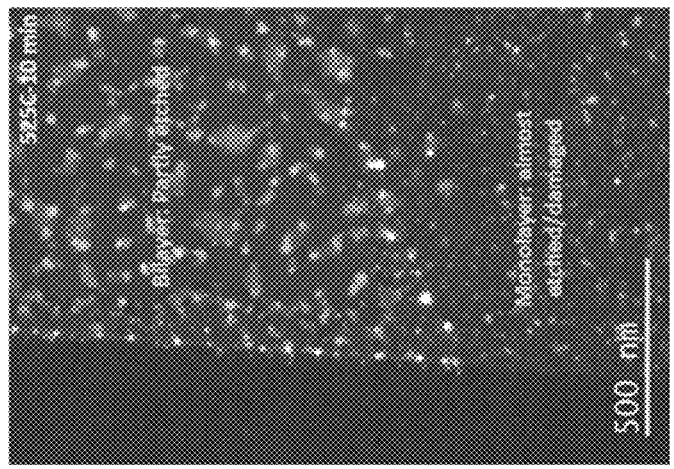
FIGS. 20A-20C provide a set of HAADF-STEM images highlight the different regions of $MoS_2$ heated ex-situ (ramping rate=25° C./min) at 525° C. for two different times (5 and 10 minutes), at different magnifications.
Figure 20B:
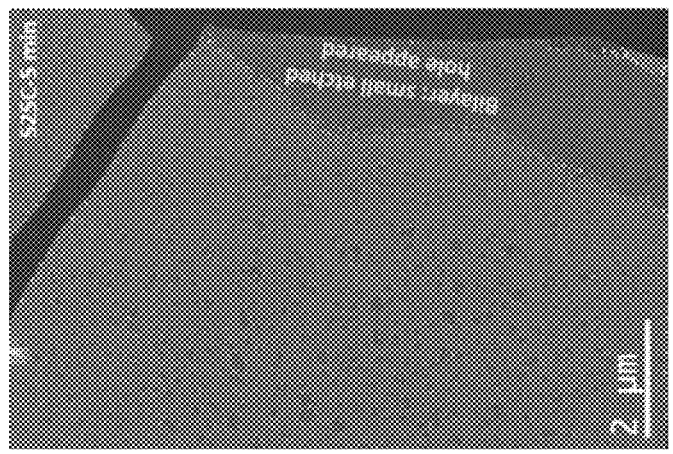
Figure 20A:
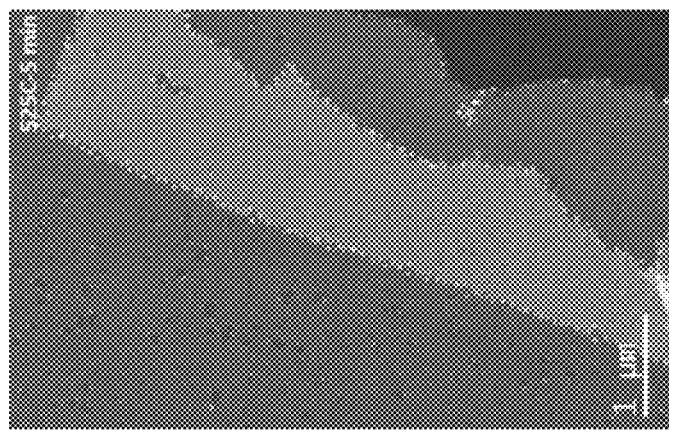

The formation of S-vacancies as the temperature is slowly increased leads to a volatile ejection of sulfur compounds, reducing the composition of sulfur in the lattice. This mechanism has explored in previous reports[30,61,62]. Since there is a net loss of S from the lattice due to the low energy of vacancy formation and adatom evaporation, this results in a non-stoichiometric decomposition which leads to the formation of nanocrystalline to amorphous $MoS_2$ or Mo nanocrystals. This can be clearly seen in the atomically resolved HAADF-STEM images as well as the corresponding Fast Fourier transform (FFT) pattern analyses (FIG. 5C-5D and FIGS. 19A-19B). To further clarify our ex-situ observations of samples subjected to a slow heating rate, the same thermal decomposition was carried out for samples held at fixed temperature (525° C.) for different lengths of time (5 and 10 mins), as shown in FIGS. 20A-20C. These HAADF-STEM images provide insight into the mechanistic behaviour during ex-situ thermal decomposition: as the time at 525° C. increases, the formation rate and areal density of pores also increases, which leads to increased void formation in the multilayers and monolayers (FIG. 20C). After 10 minutes of annealing, bright contrast regions begin to appear, which indicates the formation of $Mo/MoS_x$ nanocrystals along with adjacent regions of amorphized $MoS_2$. This suggests that the non-stoichiometric disintegration first results in formation of nanocrystalline or amorphous $Mo_xS_{2-x}$ followed by near complete removal of S to form Mo metal nanocrystals. BF-TEM image and compositional analysis are provided in FIG. 5E. To verify that the ex-situ, slowly heated samples in a furnace are not affected by trace oxygen or different quality of vacuum in a tube furnace vs. the TEM column, also performed were control experiments in an inert, ultra-high purity Ar environment (99.995%) where one can observe similar etching results (see FIGS. 21A-21G). Here, the increased vapor pressure due to the Ar environment as compared to vacuum raises the disintegration temperature, consistent with our proposed mechanism described below (FIGS. 6A-6B).

Discussion

During rapid in-situ heating, the samples are heated at 25° C./sec from 500° C. to 700° C. (FIG. 6A), while during the ex-situ experiment shown in FIG. 6B the sample was heated over the same temperature range at a rate of 25° C./min. The non-equilibrium heating rate (FIG. 6A) causes sulfur vacancies to form quickly, leading to S-adatoms on the $MoS_2$ surface. Over time, collisions between the rapidly expanding adatom population lead to formation of volatile elemental sulfur compounds ($S_2$, $S_8$) which leave the surface. However, in only a few seconds, the temperature increases to the point where Mo vacancies begin to form (700° C.), leading to Mo adatoms on the $MoS_2$ surface. This is assisted by the formation of sulfur vacancy line defects, which reduce the formation energy of a Mo vacancy by increasing the local chemical potential of Mo[17,50].

The chemical potential imbalance occurs because the diffusion rate of the S vacancies is much faster (barrier of 0.8 eV) than that of the S adatoms (barrier of 1.6 eV), which allows the Mo adatoms to begin forming before the volatile S compounds form and leave the surface[50,63]. The combination of line defects and sulfur conservation on the surface leads to both void formation and a CVD—type environment for stoichiometric nucleation. CVD growth studies have shown that temperatures of 700° C.-800° C. preferentially lead to vertically stacked $MoS_2$ growth instead of monolayer growth[55,63,64]. Random nucleation of these additional layers can lead to a mixture of 2H and 3R stackings, but as voids become larger and multilayer islands become thicker, one can expect a shift toward the 3R morphology below 1000° C., consistent with the bulk phase diagram". In contrast, the sample in FIG. 6B spends several minutes in the regime where sulfur vacancies can form but where the temperature is too low to activate Mo adatoms, due to the lower heating rate.

The slow heating rate allows for enough time for volatile sulfur compounds to form and leave the surface. This explains the increased depression of the melt process in vacuum versus the neutral Ar environment, where the reduced vapor pressure accelerates the formation and evolution of the volatile sulfur rich compounds. This pushes the remaining atomic composition of the lattice into the Mo+MoS$_2$ or Mo+Mo$_2$S$_3$ regimes on the bulk phase diagram. The phase transition temperature is affected by both the vapor pressure and the melting point suppression effect of nanoconfinement. At this reduced sulfur concentration, one can expect two-phase regions of Mo and either MoS$_2$ or Mo$_2$S$_3$ to form, as observed in the ex-situ heating experiments.

In conclusion, provided is a detailed analysis of thermal decomposition and disintegration of atomically thin MoS$_2$ via electron microscopy and spectroscopic analysis. One can observe that high heating rates lead to spontaneous disintegration of MoS$_2$ single crystalline flakes into highly crystalline, nanosized crystals down to 5 nm in diameter, which is in the regime of strong electronic quantum confinement[38]. Furthermore, one can observe that this rapid heating leads to a partial disintegration and the subsequent formation of 3R phases in close proximity to the original 2H phase. The nanocrystals in the partially disintegrated region maintain an epitaxial relationship with the underlying layer of MoS$_2$ while the fully disintegrated regions show random orientation of MoS$_2$ nanocrystals. In contrast, slow heating results in non-stoichiometric decomposition of MoS$_2$ single crystals, resulting in first formation of nanocrystalline to amorphous Mo$_x$S$_{2-x}$ and ultimately Mo metal nanocrystals due to sulfur evaporation.

Our study delineates the pathways by which thermally induced disintegration of atomically thin chalcogenides occurs and elucidates the impact of heating rates on the reaction products. This is critical knowledge in applications such as phase change memory, high temperature lubrication, and catalytic processes where MoS$_2$ can be used. In addition, our studies provide a unique pathway towards creation of an atomically-thin, highly ordered, quantum-dot like structures via top-down processing which exhibit unforeseen electronic and optical properties for optoelectronic or catalytic applications.

Methods

Materials Synthesis and Experimental Procedures

Mechanically exfoliated 2D MoS$_2$ layers were prepared using the conventional scotch tape method, as described elsewhere[65]. The thickness of the exfoliated layers has been intentionally chosen such that each sample could be reproduced for further thermal diffusion analysis. Exfoliated MoS$_2$ layers were transferred to the TEM chips/grids with help of a poly-dimethyl siloxane (PDMS) strip, using a dry transfer technique that utilizes micromanipulator stages attached to an optical microscope. After transferring MoS$_2$ to TEM grids, samples were annealed in a quartz tube furnace in a closed gas (Ar+H$_2$) environment to remove all PDMS contaminants. Annealing was performed at 300° C. for 2 hrs to clean contaminants as well as release the strain developed during the pressure-based transfer method.

In-situ heating experiments at various temperatures have been done in a specialised TEM holder from Hummingbird Scientific, where a uniquely designed microfabricated heating chip was used. An embedded heating element provides robust stability to perform in-situ thermal diffusion analysis at elevated temperatures. Here was used a microfabricated heating element for heating inside the TEM column (in-situ). Because of the very small size of the heating element, one can achieve an ultra-fast heating rate (max 200° C./sec). In contrast, a quartz tube furnace was used for ex-situ experiments, which can achieve a maximum of 40° C./min.

A 25° C./min heating rate was chosen respectively for all samples in order avoid any overshoot in temperature at the final setpoint. One can used the ultra-fast 25° C./sec heating rate for the in-situ heating set-up because during ramping, it takes several seconds (~8 secs) to reach the final transformation temperature. This time interval is sufficient to allow for correction of defocusing in the height/image plane of the sample for TEM/STEM imaging, since the rapid heating leads to a change in the vertical position of the sample. Heating calibration was received from the manufacturer to achieve controlled heating based on resistance measurements.

Figure 22:
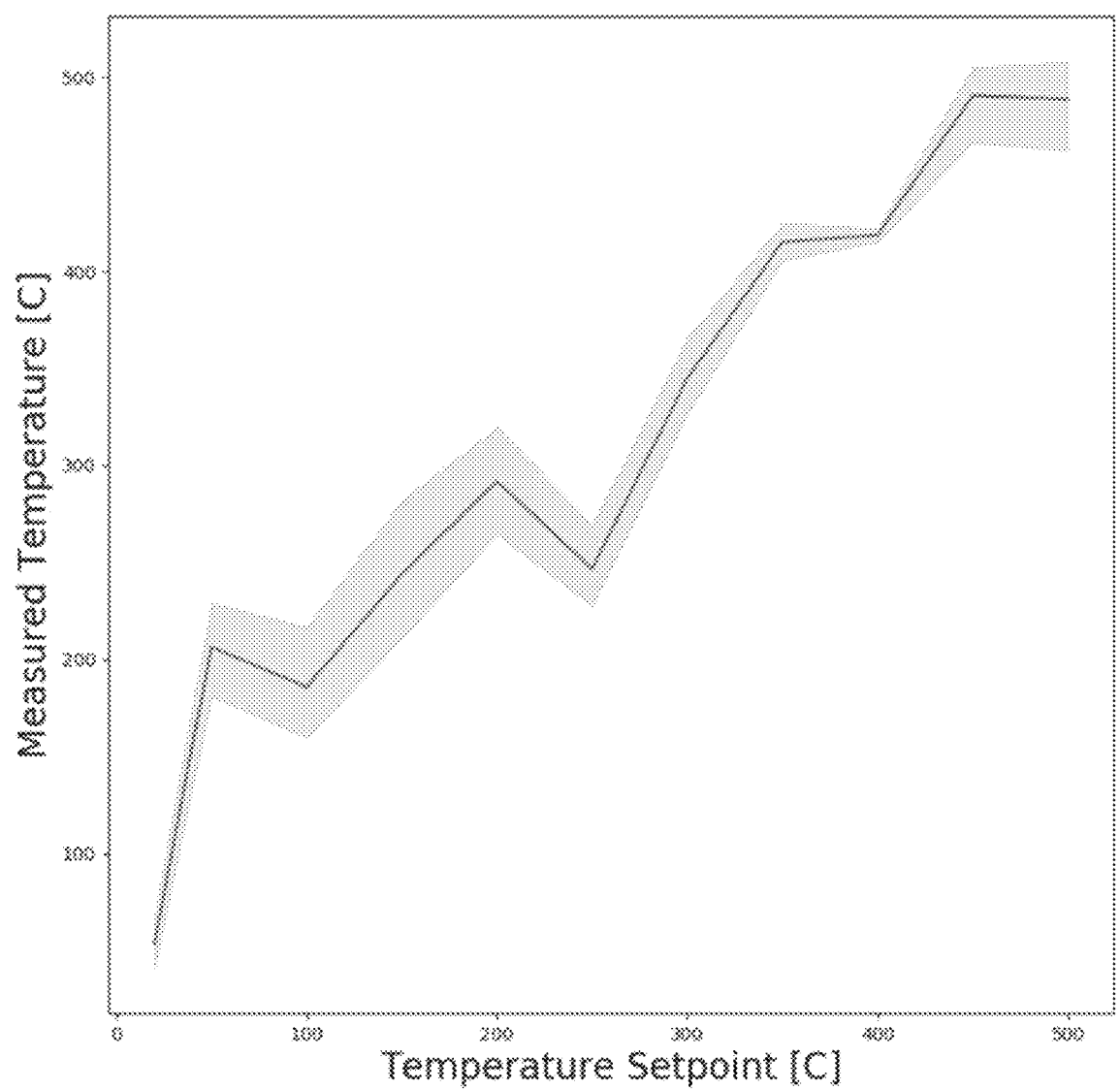
FIG. 22 provides a temperature profile measured using Raman Thermometry vs. the expected temperature (shaded region covers the spread of 3 measurements per temperature).
Figure 23:
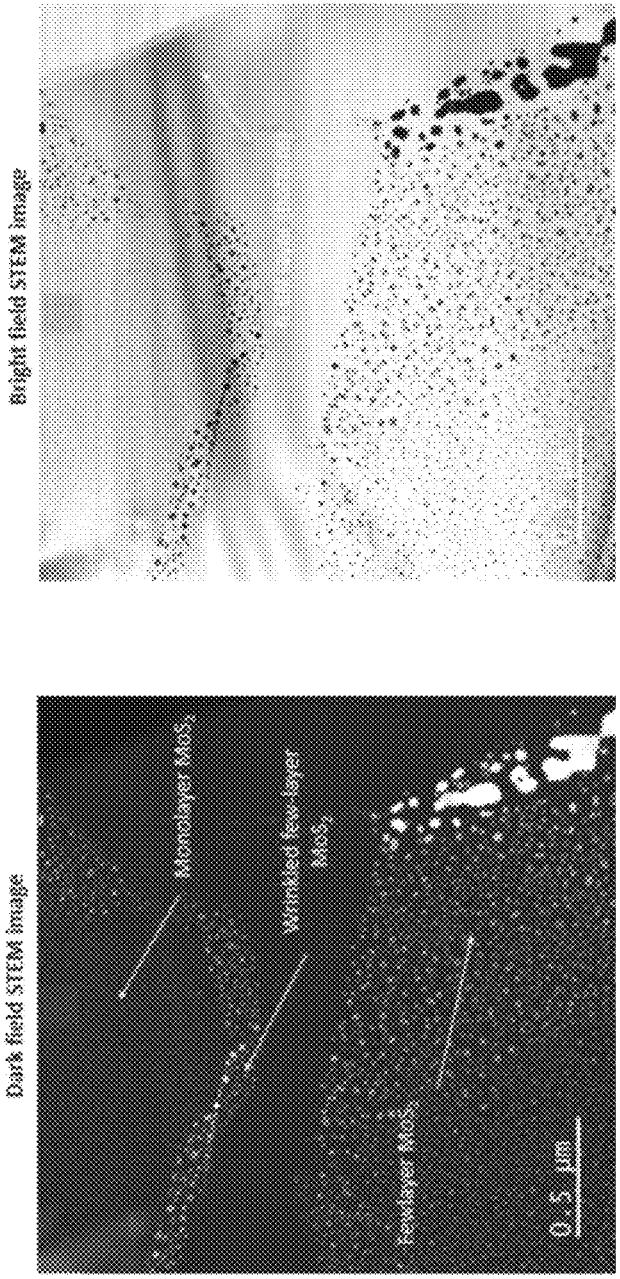
FIG. 23 illustrates dark field (left panel) and bright field (right panel) images of the uniform disintegration of $MoS_2$ when heating is performed in the presence of a thermally-conducting h-BN layer.
Figure 24:
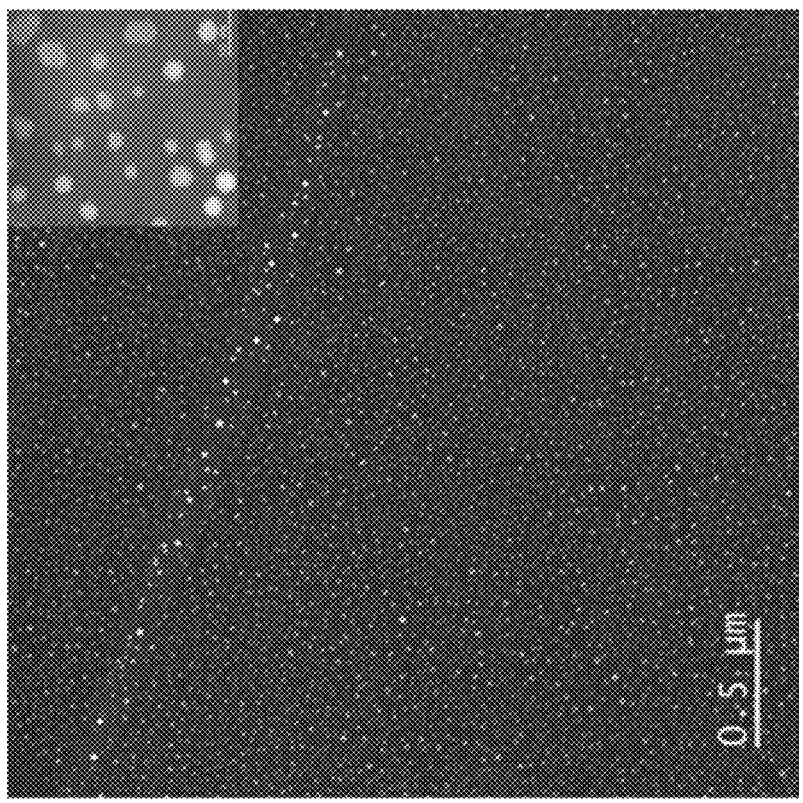
FIG. 24 illustrates a size distribution of TMDC platelets after $MoS_2$ monolayer disintegration, with $MoS_2$ disposed on h-BN.
Figure 25:
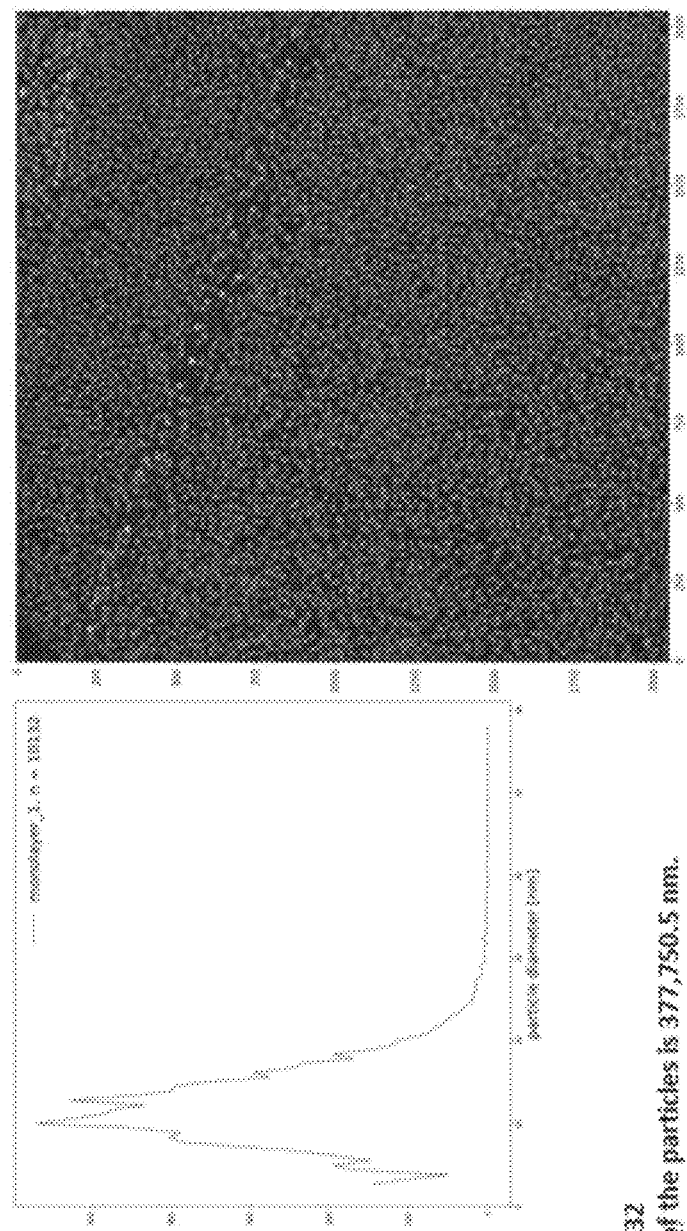
FIG. 25: Illustrates (left panel) the narrow size distribution achieved by the disclosed technology and (right panel) exemplary platelets produced according to the present disclosure. Also provided in FIG. 25 are example, non-limiting calculations showing the ratio of the perimeters of the particles contained within an image to the perimeter of the image itself.
Figure 27:
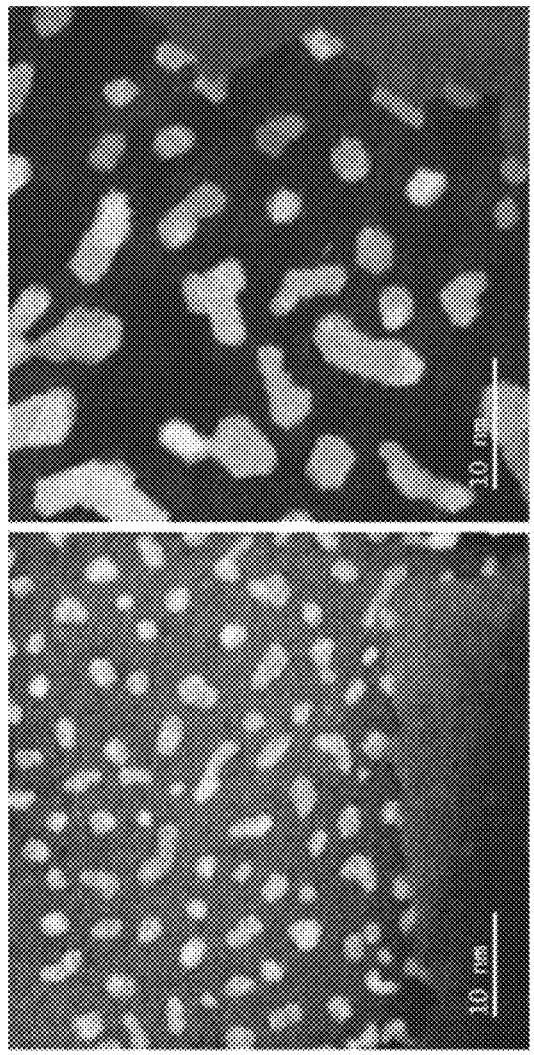
FIG. 27 illustrates exemplary $WSe_2$ quantum particle formation at 950 deg C.

One can verify heating chip calibrations through Raman Thermometry using Si particles (details provided elsewhere herein along with the exemplary calibration curve shown in FIG. 22). Equilibrium/slow heating was best-performed ex-situ whereas uniform heating (over a few cm areas) has been achieved with a constant heating rate for many different temperatures inside a quartz tube furnace (Lindberg/Blue M mini-mite, Thermo Fisher Scientific). The rough vacuum level of the quartz tube furnace is $\sim 10^{-3}$ mbar, and the TEM column is at a high vacuum ($\sim 10^{-6}$ mbar). Since the vacuum level is directly related to the vapor pressure of the MoS$_2$, the temperature at which the disintegration phenomena occur are different[66,67] for in-situ vs. ex-situ heating, illustrated in FIGS. 1A-1G. One does not expect any significant differences for slow heating in-situ.

The in-situ conditions with a higher vacuum would lead to even more thorough removal of the S as it evaporates during slow heating. Additional conditions used for the in-situ and ex-situ experiments are mentioned in Table 1.

STEM Measurements

Scanning transmission electron microscopy (STEM) has been used to measure and analyze all the samples made for in-situ and ex-situ heating experiments. Two different TEM/STEM systems were used: a JEOL F200 S/TEM, and probe-corrected JEOL NEOARM STEM, both operated at 200 kV accelerating voltage. For the JEOL NEOARM STEM, the condenser lens aperture was 40 μm with a camera length of 4 cm for imaging. The probe current was 120 pA.

All of the captured TEM images were collected on GATAN IS One View (JEOL F200) and Ultra-scan cameras (JEOL NEO ARM), and the STEM images were recorded on the integrated JEOL bright-field and annular dark field detectors. In-situ TEM videos were acquired on the JEOL F200 using GATAN OneView IS camera at 50 fps with 2k×2k resolution. Corresponding elemental identification has been performed using a dual detector EDX on the F200 system.

Experimentally acquired STEM images are smoothed using the adaptive gaussian blur function (with radius of 1-2 pixels) available in ImageJ. Image simulation has been performed using QSTEM software[40]. QSTEM is combined with ImageSim for focal series reconstructor and QMB model builder. Adopted parameters for the image simulation were the same as in the experimental conditions for AC-STEM measurements. Image analysis and feature extraction were preformed using the open source SciKit-Image[54] python library.

Additional disclosure can be found in Kumar, P., Horwath, J. P., Foucher, A. C. et al. Direct visualization of out-of-equilibrium structural transformations in atomically thin chalcogenides. npj 2D Mater Appl 4, 16 (2020) https://doi.org/10.1038/s41699-020-0150-2, and also in Direct Visualisation of Out-of-Equilibrium Structural Transformations in Atomically-Thin Chalcogenides, arXiv:2002.08845

[cond-mat.mtrl-sci], both of which are incorporated herein in their entireties for any and all purposes.

The in-situ fabrication technique of Nanoparticle/Quantum-particles was extended to an ex-situ context by using a rapid thermal annealing system. Using this process, TMDC layers were transformed into nanoparticles/Quantum-particles on a large scale. Such a process is limited only by size in that the size of the thermal annealing vessel is the only limiting factor on the areal size of sample processing.

Figure 28C:
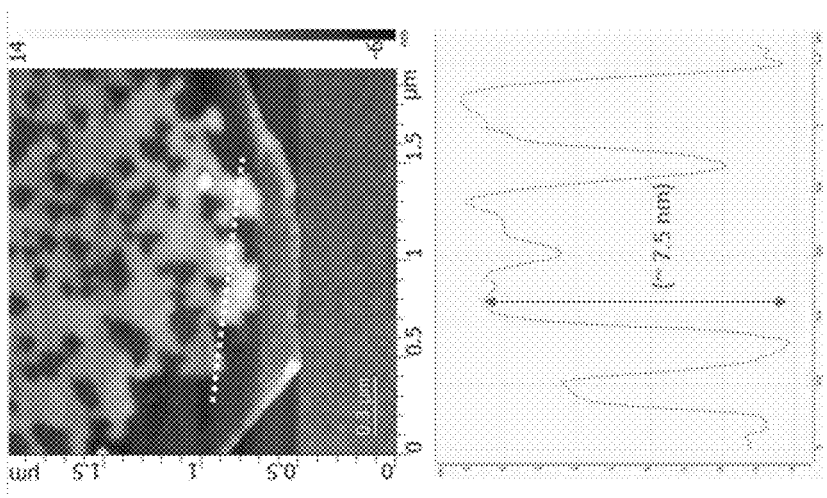
FIGS. 28A-28C illustrate nanoparticle formation with an example ex-situ technique capable of making nanoparticles at scale.
Figure 28B:
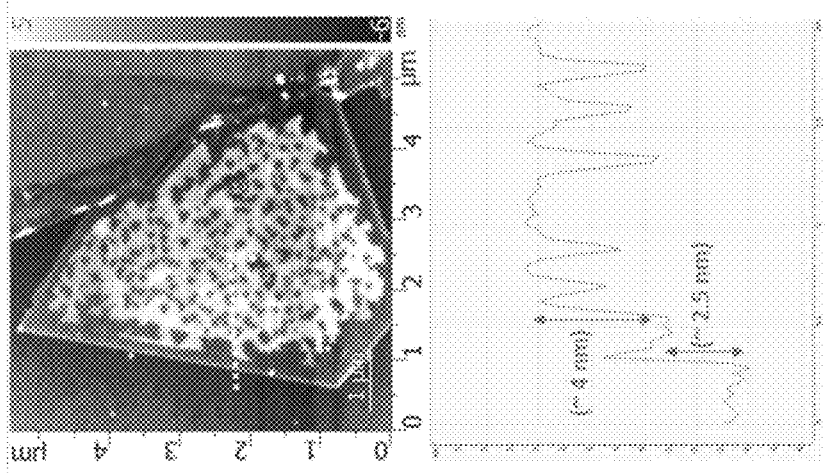
Figure 28A:
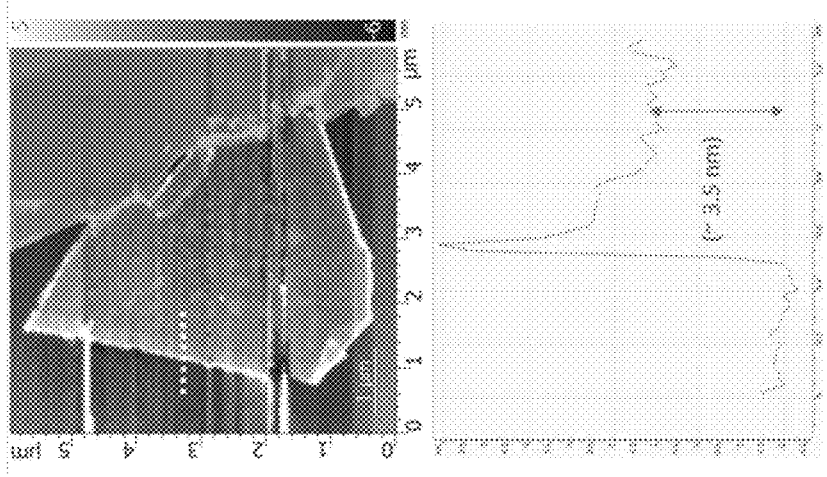

Exemplary data are provided in FIGS. 28A-28C. FIG. 28A shows pristine mechanically exfoliated few-layer $MoS_2$ without any rapid thermal heating process. One can see that the layer's initial uniform morphology and the corresponding thickness is approximately 3.5 nm. The layer was transformed to nanoparticles (few top layers) when heated using a custom rapid thermal annealing system at 800° C. for 45 seconds. FIG. 28B and FIG. 28C show the AFM height (thickness profile at the bottom) image. One can see the small triangular brighter contrast regions that corroborate the formation of thicker $MoS_2$ particles but significantly smaller in size (ranging from 20 to 50 nm).

Aspects

The following Aspects are illustrative only and do not serve to limit the scope of the present disclosure or the appended claims.

Aspect 1. A composition, comprising: a population of crystalline transition metal dichalcogenide platelets having the empirical formula $MC_2$, wherein M is a transition metal and C is a chalcogenide, each of the platelets comprising a region of 2H phase and/or a region of 3R phase, and each of the platelets being characterized as comprising a single atomic layer to a few atomic layers.

A platelet can comprise a region of 2H phase and also a region of 3R phase. In some embodiments, a platelet (or a population of platelets) can comprise (on an area basis) more 2H phase than 3R phase. In some embodiments, a platelet (or a population of platelets) can comprise (on an area basis) more 3R phase than 2H phase. In still other embodiments, a platelet (or a population of platelets) can comprise (on an area basis) equal amounts of 2H phase and 3R phase. A platelet can include either one or both of a 2H phase and a 3R phase. On an area basis, a platelet can have a ratio of 2H phase to 3R phase of from 100:1 to 1:00, from 50:1 to 1:50, from 30:1 to 1:30, from 25:1 to 1:25, from 10:1 to 1:10, from 5:1 to 1:5, from 3:1 to 1:3, from 2:1 to 1:2, or even 1:1 (and any and all intermediate values).

A platelet can have 1 atomic layer. A platelet can also have from 2 to 10 atomic layers, e.g., from 2 to 10 layers, from 2 to 9 layers, from 2 to 8 layers, from 2 to 7 layers, from 2 to 6 layers, from 2 to 5 layers, from 2 to 4 layers, or even 2 or 3 layers.

Aspect 2. The composition of Aspect 1, wherein the population of crystalline transition metal dichalcogenide platelets is characterized as having an essentially monodisperse distribution of cross-sectional dimensions. The population of platelets can have a standard deviation of about 20%, about 15%, or even about 10% of the average cross-sectional dimension of the platelets. The population of platelets can have a standard deviation of less than about 20%, less than about 15%, or even less than about 10% of the average cross-sectional dimension of the platelets. In one exemplary experiment, platelets according to the present disclosure exhibited an average diameter of 5.87 nm with a standard deviation of 1.55 nm. A population of platelets can have an average diameter of, e.g., from about 3 to about 10 nm, or from about 4 to about 9 nm, or from about 5 to about 8 nm, or even from about 6 to about 7 nm.

Aspect 3. The composition of any one of Aspects 1-2, wherein the population of platelets has an average cross-sectional dimension in the range of from about 2 nm to about 40 nm. The population can have an average cross-sectional dimension in the range of from about 2 nm to about 40 nm, or from about 5 nm to about 35 nm, or from about 10 nm to about 30 nm, or from about 15 nm to about 25 nm, or even about 20 nm.

Aspect 4. The composition of Aspect 3, wherein the population of platelets has an average cross-sectional dimension in the range of from about 2 nm to about 10 nm.

Aspect 5. The composition of Aspect 4, wherein the population of platelets has an average cross-sectional dimension in the range of from about 2 nm to about 5 nm.

Aspect 6. The composition of any one of Aspects 1-5, wherein a majority of the platelets in the population define a shape between circle and hexagon, optionally wherein at least about 60% of the platelets in the population define a shape between circle and hexagon, optionally wherein at least about 70% of the platelets in the population define a shape between circle and hexagon, optionally wherein at least about 80% of the platelets in the population define a shape between circle and hexagon, or optionally wherein at least about 90% of the platelets in the population define a shape between circle and hexagon. For example, such a shape could be circular, ovoid, American football-shaped, triangular, a 4-sided polygon, a 5-sided polygon, or a 6-sided polygon.

Aspect 7. The composition of any one of Aspects 1-6, wherein C is S, Se, or Te. S is considered a particularly suitable chalcogenide, although Se and Te are also suitable. Other chalcogenides (e.g., Po) can also be used.

Aspect 8. The composition of any one of Aspects 1-7, wherein M is Ti, Cr, W, Mn, Mo, Va, Fe, Co, or Pt.

Aspect 9. The composition of Aspect 8, wherein M is Mo.

Aspect 10. A hydrodesulfurization or hydrodenitrogenation catalyst, the hydrodesulfurization or hydrodenitrogenation catalyst comprising an amount of a composition according to any one of Aspects 1-9. Such catalysts can comprise a catalyst support and/or binder. Catalyst can be present in various forms, e.g., powder, granules, film, membrane, and the like. A catalyst can be present in a cartridge or other unit, which unit can be insertable and/or replaceable.

Aspect 11. An emitter, the emitter comprising an amount of a composition according to any one of Aspects 1-9. Such emitters can be in the form of LEDs.

Aspect 12. A photodetector, the photodetector comprising an amount of a composition according to any one of Aspects 1-9.

Aspect 13. A method, comprising contracting petroleum, a petroleum derivative, or a fuel with a composition according to any one of Aspects 1-9 so as to effect removal or chemical conversion of a component of the petroleum, the petroleum derivative, or the fuel.

Aspect 14. The method of Aspect 13, wherein the component comprises one or both of nitrogen and sulfur.

Aspect 15. A method, comprising collecting a signal related to the illumination of a device that comprises a composition according to any one of Aspects 1-9. Such collection can be accomplished by, e.g., a photodetector, a PMT, and the like.

Aspect 16. A method, comprising effecting emission of illumination from a device that comprises a composition according to any one of Aspects 1-9. Such a device can be, e.g., an LED, a laser, and the like.

Aspect 17. A method, comprising contacting water or an aqueous medium with a composition according to any one of Aspects 1-9 under such conditions so as to effect formation of oxygen and hydrogen from the water. Without being bound to any particular theory, the disclosed compositions can be useful in water-splitting reactions. A user can, in some embodiments, effect natural and/or synthetic illumination of the composition and water; without being bound to any particular theory or embodiment, illumination can be useful in modulating the progress of such reactions.

Aspect 18. A method, comprising: heating a transition metal dichalcogenide material having the empirical formula $MC_2$ at a rate of from about 20 to about 50 deg. C./second, wherein M is a transition metal and C is a chalcogenide, and wherein the heating is applied so as to give rise to a composition comprising population of crystalline transition metal dichalcogenide platelets, each of the platelets comprising a region of 2H phase and/or a region of 3R phase, and each of the platelets being characterized as comprising a single layer to a few atomic layers.

Aspect 19. The method of Aspect 18, wherein the composition is a composition according to any one of Aspects 1-9.

Aspect 20. The method of any one of Aspects 18-19, wherein the heating is from about 20 to about 50 deg. C./second. Heating can also be from about 21 to about 49 deg. C./second, or from about 23 to about 47 deg. C./second, or from about 25 to about 45 deg. C./second, or from about 27 to about 43 deg. C./second, or from about 30 to about 40 deg. C./second, or from about 33 to about 37 deg. C./second. The heating can be applied over the course of, e.g., from about 5 to about 50 seconds, or from about 7 to about 48 seconds, or from about 9 to about 46 seconds, or from about 11 to about 44 seconds, or from about 13 to about 42 seconds, or from about 15 to about 40 seconds, or from about 17 to about 37 seconds, or from about 19 to about 39 seconds or from about 21 to about 37 seconds, or from about 25 to about 35 seconds, or even for about 30 seconds.

Aspect 21. The method of any one of Aspects 18-20, wherein the heating is applied to as to achieve a maximum temperature of less than about 1000 deg. C. As an example, the heating can be applied to achieve a maximum temperature of less than about 1000 deg. C., less than about 975 deg. C., less than about 950 deg. C., less than about 925 deg. C., less than about 950 deg. C., less than about 925 deg. C., less than about 900 deg. C., less than about 875 deg. C., less than about 850 deg. C., less than about 825 deg. C., less than about 800 deg. C., less than about 750 deg. C., less than about 725 deg. C., less than about 700 deg. C., less than about 675 deg. C., less than about 650 deg. C., less than about 625 deg. C., less than about 600 deg. C., less than about 575 deg. C., less than about 550 deg. C., less than about 525 deg. C., or even less than about 500 deg. C.

Aspect 22. The method of Aspect 21, wherein the heating is applied so as to achieve a maximum temperature of less than about 650 deg. C. The transition metal dichalcogenide material can be pre-heated, e.g., held at a temperature of about room temperature before the further heating is applied. As an example, the transition metal dichalcogenide material can be pre-heated to 100° C. and then heated at 30° C./second up to 700° C.

Aspect 23. The method of any one of Aspects 18-22, wherein the transition metal dichalcogenide material is at a temperature of from about 300 to about 550 deg. C. when the heating is applied.

Aspect 24. The method of Aspect 23, wherein the wherein the transition metal dichalcogenide material is at a temperature of about 500 deg. C. when the heating is applied.

Aspect 25. The method of any one of Aspects 18-24, wherein the transition metal dichalcogenide material contacts at least one heat conducting substrate during the heating, the heat conducting substrate optionally comprising boron nitride or silicon nitride.

In some embodiments, the transition metal dichalcogenide material is sandwiched between two heat conducting substrates, e.g., two portions of boron nitride, two portions of silicon nitride, or between a portion of boron nitride and a portion of silicon nitride.

REFERENCES

The following references are listed for the reader's convenience. The inclusion of a reference here should not be taken as any suggestion that the reference is material to the patentability of the disclosed subject matter 1 Novoselov, K. S. et al. Two-dimensional atomic crystals. *Proceedings of the National Academy of Sciences of the United States of America* 102, 10451-10453, doi:10.1073/pnas.0502848102 (2005).

2 Jariwala, D. et al. Emerging Device Applications for Semiconducting Two-Dimensional Transition Metal Dichalcogenides. *ACS Nano* 8, 1102-1120, doi:10.1021/nn500064s (2014).

3 Li, Z. et al. Direct Observation of Gate-Tunable Dark Trions in Monolayer $WSe_2$. *Nano Letters* 19, 6886-6893, doi:10.1021/acs.nanolett.9b02132 (2019).

4 Zhao, X. et al. Healing of Planar Defects in 2D Materials via Grain Boundary Sliding. *Advanced Materials* 31, 1900237, doi:10.1002/adma.201900237 (2019).

5 Lin, Y.-C., et al. Atomic mechanism of the semiconducting-to-metallic phase transition in single-layered MoS2. *Nature Nanotechnology* 9, 391-396, doi:10.1038/nnano.2014.64 (2014).

6 Kappera, R. et al. Phase-engineered low-resistance contacts for ultrathin MoS2 transistors. *Nature Materials* 13, 1128-1134, doi:10.1038/nmat4080 (2014).

7 Voiry, D. et al. Phase engineering of transition metal dichalcogenides. *Chemical Society Reviews* 44, 2702-2712, doi:10.1039/C5CS00151J (2015).

8 Kumar, P. et al. Phase engineering of seamless heterophase homojunctions with co-existing 3R and 2H phases in WS2 monolayers. *Nanoscale* 10, 3320-3330, doi: 10.1039/C7NR08303C (2018).

9 Ng, H. K. et al. Effects Of Structural Phase Transition On Thermoelectric Performance in Lithium-Intercalated Molybdenum Disulfide (LixMoS2). *ACS Applied Materials & Interfaces* 11, 12184-12189, doi:10.1021/acsami.8b22105 (2019).

10 Eda, G. et al. Coherent Atomic and Electronic Heterostructures of Single-Layer MoS2. *ACS Nano* 6, 7311-7317, doi:10.1021/nn302422x (2012).

11 Lin Y. C. et al. Does the metallic 1T phase WS2 really exist? *arXiv:* 1907.11398 (2019).

12 Chhowalla, M. et al. The chemistry of two-dimensional layered transition metal dichalcogenide nanosheets. *Nature Chemistry* 5, 263-275, doi:10.1038/nchem.1589 (2013).

13 Chhowalla, M., Liu, Z. & Zhang, H. Two-dimensional transition metal dichalcogenide (TMD) nanosheets. *Chemical Society Reviews* 44, 2584-2586, doi:10.1039/C5C590037A (2015).

14 Leng, K. et al. Phase Restructuring in Transition Metal Dichalcogenides for Highly Stable Energy Storage. *ACS Nano* 10, 9208-9215, doi:10.1021/acsnano.6b05746 (2016).

15 Chen, Z. et al. Interface confined hydrogen evolution reaction in zero valent metal nanoparticles-intercalated molybdenum disulfide. *Nature Communications* 8, 14548, doi:10.1038/ncomms14548 (2017).

16 Ryu, G. H. et al. Atomic Structure and Dynamics of Self-Limiting Sub-Nanometer Pores in Monolayer WS2. *ACS Nano* 12, 11638-11647, doi:10.1021/acsnano.8b07051 (2018).

17 Chen, Q. et al. Ultralong 1D Vacancy Channels for Rapid Atomic Migration during 2D Void Formation in Monolayer $MoS_2$. *ACS Nano* 12, 7721-7730, doi:10.1021/acsnano.8b01610 (2018).

18 Murthy, A. A. et al. Direct Visualization of Electric-Field-Induced Structural Dynamics in Monolayer Transition Metal Dichalcogenides. *ACS Nano*, doi:10.1021/acsnano.9b06581 (2020).

19 Mendes, R. G. et al. Electron-Driven In Situ Transmission Electron Microscopy of 2D Transition Metal Dichalcogenides and Their 2D Heterostructures. *ACS Nano* 13, 978-995, doi:10.1021/acsnano.8b08079 (2019).

20 Jariwala, D. et al. Mixed-dimensional van der Waals heterostructures. *Nature Materials* 16, 170-181, doi: 10.1038/nmat4703 (2017).

21 Sangwan, V. K. et al. Gate-tunable memristive phenomena mediated by grain boundaries in single-layer MoS2. *Nature Nanotechnology* 10, 403-406, doi:10.1038/nnano.2015.56 (2015).

22 Oliva, R. et al. Pressure dependence of direct optical transitions in ReS2 and ReSe2. *npj 2D Materials and Applications* 3, 20, doi:10.1038/s41699-019-0102-x (2019).

23 Chen, J., Ryu, G. H., Sinha, S. & Warner, J. H. Atomic Structure and Dynamics of Defects and Grain Boundaries in 2D Pd2Se3 Monolayers. *ACS Nano* 13, 8256-8264, doi:10.1021/acsnano.9b03645 (2019).

24 Sutter, E. et al. Electron-Beam Induced Transformations of Layered Tin Dichalcogenides. *Nano Letters* 16, 4410-4416, doi:10.1021/acs.nanolett.6b01541 (2016).

25 Lin, J. et al. Novel Pd2Se3 Two-Dimensional Phase Driven by Interlayer Fusion in Layered PdSe2. *Physical Review Letters* 119, 016101, doi:10.1103/PhysRevLett.119.016101 (2017).

26 Elibol, K. et al. Atomic Structure of Intrinsic and Electron-Irradiation-Induced Defects in MoTe2. *Chemistry of Materials* 30, 1230-1238, doi:10.1021/acs.chemmater.7b03760 (2018).

27 Lehnert, T. et al. Electron-Beam-Driven Structure Evolution of Single-Layer MoTe2 for Quantum Devices. *ACS Applied Nano Materials* 2, 3262-3270, doi:10.1021/acsanm.9b00616 (2019).

28 Tai, K. L. et al. Atomic-Scale Fabrication of In-Plane Heterojunctions of Few-Layer MoS2 via In Situ Scanning Transmission Electron Microscopy. *Small*, doi:10.1002/sml1.201905516 (2019).

29 Zuluaga, S. et al. Two-dimensional PdSe2-Pd2Se3 junctions can serve as nanowires. *2D Materials* 5, 035025, doi:10.1088/2053-1583/aac34c (2018).

30 Chen, J. et al. In situ high temperature atomic level dynamics of large inversion domain formations in monolayer MoS2. *Nanoscale* 11, 1901-1913, doi:10.1039/C8NR08821G (2019).

31 Zhao, W. et al. Energetics and kinetics of phase transition between a 2H and a 1T MoS2 monolayer—a theoretical study. *Nanoscale* 9, 2301-2309, doi:10.1039/C6NR08628D (2017).

32 Tesfaye, F. et al. *Phase Equilibria and Thermochemistry of Selected Sulfide Systems in the Pyrometallurgy of Ni and Cu* (2012).

33 Johnson, W. B. et al. A molybdenum sulfur binary phase diagram. *Scripta Metallurgica* 17, 919-922, doi:https://doi.org/10.1016/0036-9748(83)90262-4 (1983).

34 Komsa, H.-P. et al. Native defects in bulk and monolayer MoS2 from first principles. *Physical Review B* 91, 125304, doi:10.1103/PhysRevB.91.125304 (2015).

35 Pitthan, E., et al. Annealing Response of Monolayer MoS2 Grown by Chemical Vapor Deposition. *ECS Journal of Solid State Science and Technology* 8, P267-P270, doi:10.1149/2.0061904jss (2019).

36 Couchman, P. R. et al. Thermodynamic theory of size dependence of melting temperature in metals. *Nature* 269, 481-483, doi:10.1038/269481a0 (1977).

37 Lai, S. L. et al. Size-Dependent Melting Properties of Small Tin Particles: Nanocalorimetric Measurements. *Physical Review Letters* 77, 99-102, doi:10.1103/PhysRevLett.77.99 (1996).

38 Price, C. C., et al. Engineering Zero-Dimensional Quantum Confinement in Transition-Metal Dichalcogenide Heterostructures. *ACS Nano* 13, 8303-8311, doi:10.1021/acsnano.9b03716 (2019).

39 Scientific, H. *MEMS Heating+Biasing*, http://hummingbirdscientific.com/products/heating-biasing.

40 Faculty of Mathematics and Natural Sciences. QSTEM: *Quantitative TEM/STEM Simulations*, https://www.physics.hu-berlin.de/en/sem/software/software_qstem> (2002).

41 AMETEK; GATAN. OneView Camera.

42 Kingery, W. D., et al. *Introduction to ceramics*. (Wiley, 1976).

43 Li, H. et al. Epitaxial Growth of Two-Dimensional Layered Transition-Metal Dichalcogenides: Growth Mechanism, Controllability, and Scalability. *Chemical Reviews* 118, 6134-6150, doi:10.1021/acs.chemrev.7b00212 (2018).

44 Kumar, P. et al. Effect of Sulfur Evaporation Rate on Screw Dislocation Driven Growth of MoS2 with High Atomic Step Density. *Crystal Growth & Design* 16, 7145-7154, doi:10.1021/acs.cgd.6b01367 (2016).

45 Hu, Z. et al. Two-dimensional transition metal dichalcogenides: interface and defect engineering. *Chemical Society Reviews* 47, 3100-3128, doi:10.1039/C8CS00024G (2018).

46 Dumcenco, D. et al. Large-Area Epitaxial Monolayer MoS2. *ACS Nano* 9, 4611-4620, doi:10.1021/acsnano.5b01281 (2015).

47 Duan, X. et al. Lateral epitaxial growth of two-dimensional layered semiconductor heterojunctions. *Nature Nanotechnology* 9, 1024-1030, doi:10.1038/nnano.2014.222 (2014).

48 Fu, D. et al. Molecular Beam Epitaxy of Highly Crystalline Monolayer Molybdenum Disulfide on Hexagonal Boron Nitride. *Journal of the American Chemical Society* 139, 9392-9400, doi:10.1021/jacs.7b05131 (2017).

49 Koma, A. et al. Fabrication and characterization of heterostructures with subnanometer thickness. *Microelectronic Engineering* 2, 129-136, doi:10.1016/0167-9317(84)90057-1 (1984).

50 Le, D. et al. Single-Layer MoS2 with Sulfur Vacancies: Structure and Catalytic Application. *The Journal of Physical Chemistry C* 118, 5346-5351, doi:10.1021/jp411256g (2014).

51 Sood, A. et al. Quasi-Ballistic Thermal Transport Across MoS2 Thin Films. *Nano Letters* 19, 2434-2442, doi: 10.1021/acs.nanolett.8b05174 (2019).
52 Carvalho, B. R. et al. Intervalley scattering by acoustic phonons in two-dimensional MoS2 revealed by double-resonance Raman spectroscopy. *Nature Communications* 8, 14670, doi:10.1038/ncomms14670 (2017).
53 Malhotra, A. et al. Impact of Phonon Surface Scattering on Thermal Energy Distribution of Si and SiGe Nanowires. *Scientific Reports* 6, 25818, doi:10.1038/srep25818 (2016).
54 van der Walt, S. et al. scikit-image: image processing in Python. *PeerJ* 2, e453-e453, doi:10.7717/peerj.453 (2014).
55 Ye, H. et al. Toward a Mechanistic Understanding of Vertical Growth of van der Waals Stacked 2D Materials: A Multiscale Model and Experiments. *ACS Nano* 11, 12780-12788, doi:10.1021/acsnano.7b07604 (2017).
56 Chen, Q. et al. Atomically Flat Zigzag Edges in Monolayer MoS2 by Thermal Annealing. *Nano Letters* 17, 5502-5507, doi:10.1021/acs.nanolett.7b02192 (2017).
57 Wang, S. et al. Shape Evolution of Monolayer MoS2 Crystals Grown by Chemical Vapor Deposition. *Chemistry of Materials* 26, 6371-6379, doi:10.1021/cm5025662 (2014).
58 Xu, W. et al. In-situ atomic-scale observation of irradiation-induced void formation. Nature Communications 4, 2288, doi:10.1038/ncomms3288 (2013).
59 Kumar, P. et al. Scalable faceted voids with luminescent enhanced edges in WS2 monolayers. *Nanoscale* 10, 16321-16331, doi:10.1039/C8NR02246A (2018).
60 Zhou, W. et al. Intrinsic Structural Defects in Monolayer Molybdenum Disulfide. *Nano Letters* 13, 2615-2622, doi:10.1021/nl4007479 (2013).
61 Li, L. et al. Role of Sulfur Vacancies and Undercoordinated Mo Regions in MoS2 Nanosheets toward the Evolution of Hydrogen. *ACS Nano* 13, 6824-6834, doi: 10.1021/acsnano.9b01583 (2019).
62 Chen, P. et al. Thermal Degradation of Monolayer MoS2 on SrTiO3 Supports. *The Journal of Physical Chemistry C* 123, 3876-3885, doi:10.1021/acs.jpcc.8b11298 (2019).
63 Gong, Y. et al. Vertical and in-plane heterostructures from WS2/MoS2 monolayers. *Nature Materials* 13, 1135-1142, doi:10.1038/nmat4091 (2014).
64 Kumar, P. et al. Horizontally and vertically aligned growth of strained MoS2 layers with dissimilar wetting and catalytic behaviors. *CrystEngComm* 19, 5068-5078, doi:10.1039/C7CE01162H (2017).
65 Li, H. et al. Preparation and Applications of Mechanically Exfoliated Single-Layer and Multilayer MoS2 and WSe2 Nanosheets. *Accounts of Chemical Research* 47, 1067-1075, doi:10.1021/ar4002312 (2014).
66 Li, S. et al. Vapour-liquid-solid growth of monolayer MoS2 nanoribbons. *Nature Materials* 17, 535-542, doi: 10.1038/s41563-018-0055-z (2018).
67 Frankel, H. E. Effects of vacuum on materials. *ESRO ENVIRON. AND THEIR ROLE IN SPACECRAFT TECHNOL.* 1, 137-181 (Jan. 1, 1969).

What is claimed:

1. A composition, comprising:
a population of crystalline transition metal dichalcogenide platelets having the empirical formula $MC_2$, wherein M is a transition metal and C is a chalcogenide,
each of the platelets comprising a region of 3R phase and a region of 2H phase,
each of the platelets being characterized as comprising a single atomic layer to a few atomic layers, and
wherein a majority of the platelets in the population have shapes that are circular, ovoid, American football-shaped, triangular, a 4-sided polygon, a 5-sided polygon, or a 6-sided polygon.

2. The composition of claim 1, wherein the population of crystalline transition metal dichalcogenide platelets is characterized as having an essentially monodisperse distribution of cross-sectional dimensions.

3. The composition of claim 1, wherein the population of platelets has an average cross-sectional dimension in the range of from about 2 nm to about 40 nm.

4. The composition of claim 3, wherein the population of platelets has an average cross-sectional dimension in the range of from about 2 nm to about 10 nm.

5. The composition of claim 4, wherein the population of platelets has an average cross-sectional dimension in the range of from about 2 nm to about 5 nm.

6. The composition of claim 1, wherein a majority of the platelets in the population are characterized as polygonal.

7. The composition of claim 1, wherein C is S, Se, or Te.

8. The composition of claim 1, wherein M is Ti, Cr, W, Mn, Mo, Va, Fe, Co, or Pt.

9. The composition of claim 8, wherein M is Mo.

10. The composition of claim 1, wherein each of the platelets defines a heterojunction between a region of 2H phase and a region of 3R phase.

11. The composition of claim 1, wherein a crystalline transition metal dichalcogenide platelet is superposed on an underlying layer of transition metal dichalcogenide, and wherein the crystalline transition metal dichalcogenide platelet maintains an epitaxial relationship with the underlying layer of transition metal dichalcogenide.

* * * * *

UNITED STATES PATENT AND TRADEMARK OFFICE
CERTIFICATE OF CORRECTION

| | | |
|---|---|---|
| PATENT NO. | : 12,442,103 B2 | |
| APPLICATION NO. | : 17/674964 | |
| DATED | : October 14, 2025 | |
| INVENTOR(S) | : Deep Jariwala et al. | |

It is certified that error appears in the above-identified patent and that said Letters Patent is hereby corrected as shown below:

In the Specification

Under Column no. 2, Line no. 32, Replace:
"(FIG."
With:
--(FIGS.--

Under Column no. 5, Line no. 2, Replace:
"FIG."
With:
--FIGS.--

Under Column no. 5, Line no. 61, Replace:
"fewlayer"
With:
--few layer--

Under Column no. 5, Line no. 65, Replace:
"fewlayer"
With:
--few layer--

Under Column no. 6, Line nos. 54-56, Replace:
"such. It is understood that where "about" is
used before a quantitative value, the parameter"
With:
--such.--

Signed and Sealed this
Twenty-third Day of December, 2025

John A. Squires
*Director of the United States Patent and Trademark Office*

Under Column no. 9, Line no. 56, Replace:
"FIG."
With:
--FIGS.--

Under Column no. 11, Line no. 7, Replace:
"(FIG."
With:
--(FIGS.--

Under Column no. 11, Line no. 9, Replace:
"FIG."
With:
--FIGS.--

Under Column no. 11, Line no. 17, Replace:
"FIG."
With:
--FIGS.--

Under Column no. 11, Line no. 21, Replace:
"FIG."
With:
--FIGS.--

Under Column no. 13, Line no. 28, Replace:
"$MoS_2^{17,18}$."
With:
--$MoS_2$.--

Under Column no. 14, Line no. 1, Replace:
"(FIG."
With:
--(FIGS.--

Under Column no. 14, Line no. 59, Replace:
"diagram"."
With:
--diagram.--

Under Column no. 20, Line no. 63, Replace:
"C5C590037A"

With:
--C5CS90037A--

Under Column no. 22, Line no. 47, Replace:
"C8C500024G"
With:
--C8CS00024G--

In the Claims

Under Column no. 24, Claim 7, Line no. 37, Replace:
"Cis"
With:
--C is--